United States Patent
Kumar et al.

(10) Patent No.: US 11,407,359 B2
(45) Date of Patent: Aug. 9, 2022

(54) METHOD AND SYSTEM OF DISPLAYING MULTIMEDIA CONTENT ON GLASS WINDOW OF VEHICLE

(71) Applicant: Samsung Electronics Co., Ltd., Gyeonggi-do (KR)

(72) Inventors: Santosh Kumar, Noida (IN); Milind Joshi, Noida (IN); Arun Kumar Singh, Noida (IN); Ravi Kumar, Noida (IN)

(73) Assignee: Samsung Electronics Co., Ltd

( * ) Notice: Subject to any disclaimer, the term of this patent is extended or adjusted under 35 U.S.C. 154(b) by 75 days.

(21) Appl. No.: 16/507,865

(22) Filed: Jul. 10, 2019

(65) Prior Publication Data
US 2020/0017026 A1    Jan. 16, 2020

(30) Foreign Application Priority Data

Jul. 10, 2018  (IN) .............................. 201811025770
Jan. 17, 2019  (KR) ......................... 10-2019-0006134

(51) Int. Cl.
*B60R 1/00* (2022.01)
*G06F 3/01* (2006.01)
(Continued)

(52) U.S. Cl.
CPC ............ *B60R 1/00* (2013.01); *G02B 27/0101* (2013.01); *G02B 27/0179* (2013.01);
(Continued)

(58) Field of Classification Search
CPC ............... B60R 1/00; B60R 2300/102; B60R 2300/105; B60R 2300/205;
(Continued)

(56) References Cited

U.S. PATENT DOCUMENTS 7,598,977 B2 * 10/2009 Ryall ....................... H04N 5/76
                                                              348/143
9,230,367 B2    1/2016 Stroila
(Continued)

FOREIGN PATENT DOCUMENTS

JP      2014-096632         5/2014
JP      2014-096632 A  *    5/2014    ............... B60R 1/00
(Continued)

OTHER PUBLICATIONS

International Search Report dated Oct. 11, 2019 issued in counterpart application No. PCT/KR2019/008163, 9 pages.
(Continued)

*Primary Examiner* — Mohammed S Rahaman
(74) *Attorney, Agent, or Firm* — The Farrell Law Firm, P.C.

(57) ABSTRACT

Disclosed is a method of displaying content on a glass window of a vehicle, including capturing sight information of surrounding scenery of the vehicle during a first time period, by using at least one first image capturing device, identifying a request for displaying content related to the sight information from a user during a second time period after the first time period, and displaying the content related to the sight information on the glass window of the vehicle based on the request.

18 Claims, 22 Drawing Sheets

(51) Int. Cl.
*G06T 7/70* (2017.01)
*G06F 3/0484* (2022.01)
*G02B 27/01* (2006.01)

(52) U.S. Cl.
CPC .............. *G06F 3/012* (2013.01); *G06F 3/013* (2013.01); *G06F 3/0484* (2013.01); *G06T 7/70* (2017.01); *B60R 2300/102* (2013.01); *B60R 2300/105* (2013.01); *B60R 2300/205* (2013.01); *B60R 2300/80* (2013.01); *G02B 2027/0138* (2013.01); *G02B 2027/0141* (2013.01); *G02B 2027/0187* (2013.01)

(58) Field of Classification Search
CPC ........ B60R 2300/80; G02B 2027/0138; G02B 2027/0141; G02B 2027/0187; G02B 27/0101; G02B 27/0179; G06F 3/012; G06F 3/013; G06F 3/017; G06F 3/0304; G06F 3/0484; G06F 3/167; G06T 7/70
See application file for complete search history.

(56) References Cited

U.S. PATENT DOCUMENTS

| | | | |
|---|---|---|---|
| 9,701,315 B2 | 7/2017 | Wuthnow et al. | |
| 9,807,196 B2 | 10/2017 | Pisz | |
| 10,242,457 B1* | 3/2019 | Sibley | G09G 3/003 |
| 10,800,328 B2* | 10/2020 | Takazawa | B60K 37/00 |
| 2007/0081262 A1* | 4/2007 | Oizumi | B60R 1/00 |
| | | | 359/843 |
| 2008/0111666 A1 | 5/2008 | Plante et al. | |
| 2008/0291032 A1 | 11/2008 | Prokhorov et al. | |
| 2013/0002412 A1 | 1/2013 | Kido | |
| 2013/0261871 A1 | 10/2013 | Hobbs et al. | |
| 2013/0265232 A1* | 10/2013 | Yun | G06F 3/011 |
| | | | 345/158 |
| 2015/0321607 A1* | 11/2015 | Cho | H04N 5/232945 |
| | | | 348/36 |
| 2016/0104437 A1* | 4/2016 | Iwakawa | B60J 3/04 |
| | | | 345/690 |
| 2016/0307056 A1* | 10/2016 | Schiek | G06F 3/012 |
| 2017/0113702 A1* | 4/2017 | Thieberger-Navon | |
| | | | B60W 50/0097 |
| 2017/0240047 A1* | 8/2017 | Candelore | G06F 3/011 |
| 2018/0011313 A1* | 1/2018 | Nah | B60K 35/00 |
| 2020/0285884 A1 | 9/2020 | Murata et al. | |

FOREIGN PATENT DOCUMENTS

| | | |
|---|---|---|
| JP | 2016119640 | 6/2016 |
| JP | 2017-112521 | 6/2017 |
| KR | 1020160140033 | 12/2016 |
| WO | WO 2016/147387 | 9/2016 |
| WO | WO 2019/058492 | 3/2019 |

OTHER PUBLICATIONS

European Search Report dated Apr. 19, 2021 issued in counterpart application No. 19834442.6-1012, 82 pages.

* cited by examiner

1. Navigation area as tiles
2. Simple seek bar navigation
3. Logo of important objects 4. Different colors on seek bar
5. Current & passed view in PIP
6. Hidden navigation area (Based on user gesture)

METHOD AND SYSTEM OF DISPLAYING MULTIMEDIA CONTENT ON GLASS WINDOW OF VEHICLE

CROSS-REFERENCE TO RELATED APPLICATION(S)

This application is based on and claims priority under 35 U.S.C. 119 to Korean Patent Application No. 10-2019-0006134, filed on Jan. 17, 2019, in the Korean Intellectual Property Office, and to Indian Patent Application No. 201811025770, filed on Jul. 10, 2018, in the Indian Patent Office, the disclosures of which are incorporated by reference herein in their entireties.

BACKGROUND

1. Field

The disclosure relates generally to displaying multimedia content, and more particularly, to a method and system of displaying multimedia content on a glass window of a vehicle.

2. Description of Related Art

A self-driving, driverless, or robotic car has the capability of sensing its surroundings while driving on a road and navigating without any human input. Self-driving cars have pre-installed control systems which can analyze the sensory data in distinguishing between different cars and other vehicles on the road, which enables deciding a path to the destination. Cars can detect their surroundings using a variety of techniques such as light detection and ranging (LiDAR), radar, global positioning system (GPS) and odometry. Introduction of driverless cars could reduce traffic collisions, enhance mobility for injured or disabled people, and provide eco-friendly transportation and decrease the need for insurance.

Generally, human driven cars and autonomous cars come with side window glasses to protect passengers from outside extreme conditions such as like rain, dust, and extreme temperatures. At present, the window glasses are becoming more technologically integrated with the rest of the vehicle, and the growth in technologies is enabling use of automobile window glasses as displays to show various types of information.

In today's driving experience, a major problem is when a vehicle cannot stop at each and every place to see the outside environment which is interesting to travelers, due to a short time remaining for reaching the destination. For example, suppose a traveler is sitting at the back seat of an automobile and something interesting (i.e. place, scenery, animal, building, etc.) is passed by, but due to the speed of the vehicle the traveler is unable to properly see the object of interest. The outside view is often very beautiful for travelers, but as they cannot stop at each and every place, the view is passed by very quickly which results in disappointment for the travelers. To enhance such trips, there is a need in the art for a mechanism which will enable us to view the surroundings of an automobile properly while travelling.

Considering a scenario where a traveler is sitting with co-travelers and a beautiful scenic view is reached at the opposite side window where the traveler is not situated. At that time, the traveler will be unable to see the outside view properly. There is a need in the art for some mechanism which will enable the traveler to see passed view on co-travelers side window glass from other window's point of view. In another scenario, the traveler is travelling with friends or co-travelers and something interesting is passed by ion the opposite side window of the automobile. As the traveler is situated at a different side he/she may miss the view. Accordingly, there is a need in the art for some mechanism for all the travelers to share the passed view, i.e., the view of interest that the automobile has passed, on different windows of the automobile.

SUMMARY

An aspect of the disclosure is to address at least the above-mentioned problems and/or disadvantages and to provide at least the advantages described below.

Accordingly, an aspect of the disclosure is to provide a method and apparatus for enabling a viewing of passed views in an automobile.

In accordance with an aspect of the disclosure, a method of displaying content on a glass window of a vehicle includes capturing sight information of surrounding scenery of the vehicle during a first time period, by using at least one first image capturing device, identifying a request for displaying content related to the sight information from a user during a second time period after the first time period, and displaying the content related to the sight information on the glass window of the vehicle based on the request.

In accordance with another aspect of the disclosure, a device for displaying content on a glass window of a vehicle includes a memory, and a processor connected with the memory and configured to capture sight information of surrounding scenery of the vehicle during a first time period, by using at least one first image capturing device, identify a request for displaying content related to the sight information from a user during a second time period after the first time period, and display the content related to the sight information on the glass window of the vehicle based on the request.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The following description with reference to the accompanying drawings is provided to assist in a comprehensive understanding of embodiments of the disclosure. It includes various specific details to assist in that understanding but these are to be regarded as examples. Accordingly, those of ordinary skill in the art will recognize that various changes and modifications of the embodiments described herein can be made without departing from the scope and spirit of the disclosure. In addition, descriptions of well-known functions and constructions are omitted for the sake of clarity and conciseness.

Persons skilled in the art will appreciate that elements in the figures are illustrated for simplicity and clarity and may have not been drawn to scale. For example, the dimensions of some of the elements in the figure may be exaggerated relative to other elements to help to improve understanding of embodiments of the present disclosure. Throughout the drawings, it should be noted that like reference numbers are used to depict the same or similar elements, features, and structures.

The terms and words used in the following description and claims are not limited to their dictionary meanings, but are merely used to enable a clear and consistent understanding of the disclosure. Accordingly, it should be apparent to those skilled in the art that the following description of embodiments of the disclosure are provided for illustration purposes only and not for the purpose of limiting the disclosure.

It is to be understood that the singular forms "a," "an," and "the" include plural referents unless the context clearly dictates otherwise.

Those skilled in the art will understand that the principles of the present disclosure may be implemented in any suitably arranged environment system. The terms used to describe embodiments are examples provided to merely aid the understanding of the description, and that their use and definitions, in no way limit the scope of the disclosure. Terms such as "first" and "second" are used to differentiate between objects having the same terminology and are in no way intended to represent a chronological order, unless where explicitly stated.

Figure 1A:
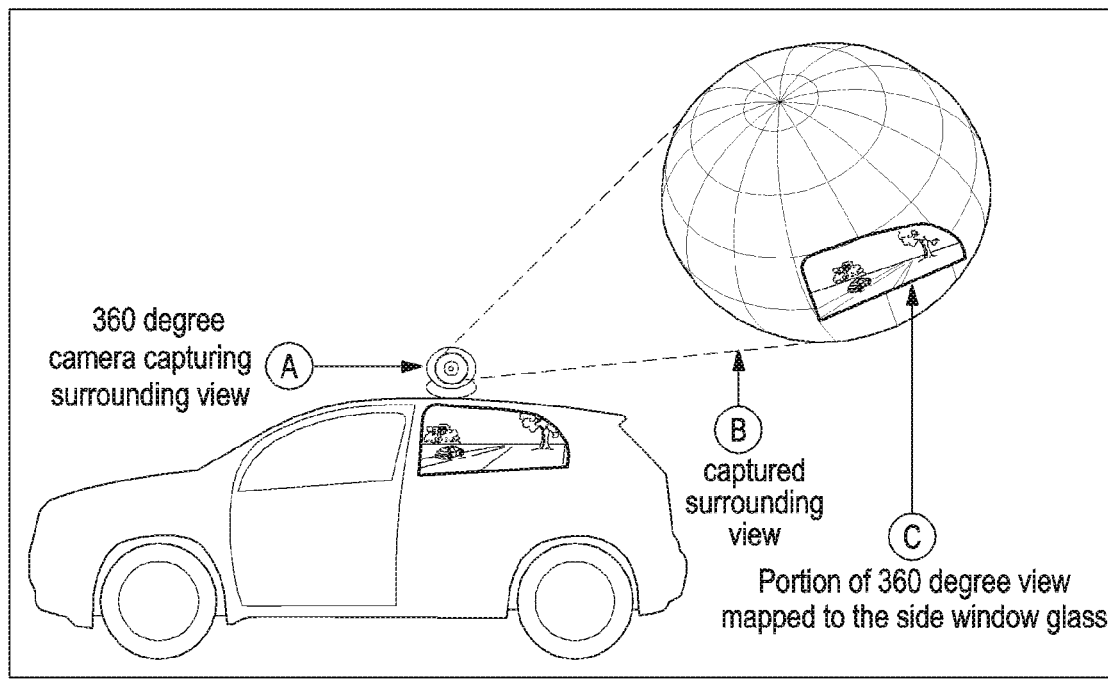
FIGS. 1A and 1B illustrates a side view of a vehicle with a 360 degree camera and a 2-dimensional camera that capture exterior fields of view according to an embodiment.
Figure 1B:
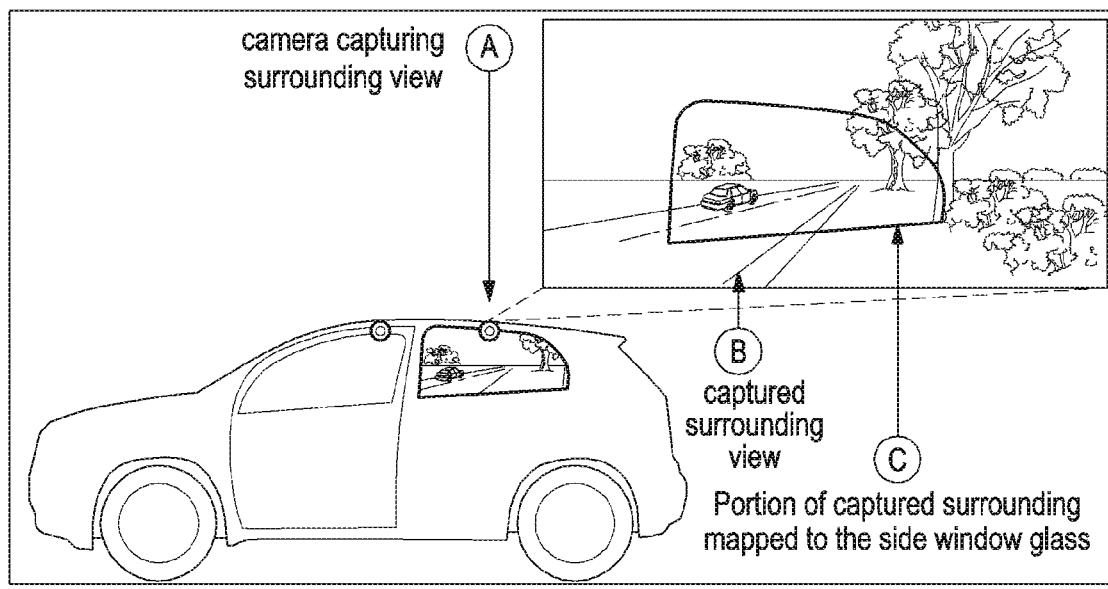

Referring to FIGS. 1A and 1B which illustrate a side view of a vehicle with a 360 degree camera, as in FIG. 1 A, and one or more 2D cameras, as in FIG. 1B. Each of the cameras captures exterior fields of view. In order to provide the passed by view visualization with interactive options, the automobile needs to record the surrounding environment (B) using multiple cameras on each window or using a 360 degree camera (A). The recorded information can be processed locally in the vehicle processor to identify interesting objects in the view. The recorded content can be processed to generate a point of view where a user is situated inside the vehicle for visualization which is required to give a real feel of visualization.

It is also possible for the recorded content to be sent to a remote server for processing including identification of various interesting objects in the recorded content, which is then presented to travelers for a quick jump to the passed by view. The information stored as media content in the storage is processed using one or more modules, such as a side glass view preparation module, which takes this content as an input for the generation of side window glass view. FIG. 1B illustrates a portion of captured surroundings mapped to the side window glass (C) upon processing locally or at the remote server.

In order to prepare the side glass view, there are various settings which are performed. Generally, autonomous automobiles come with a 360 degree camera or multiple cameras for capturing the outside surroundings. In one example, the settings may be preconfigured and are based on parameters such as size or shape of the side window glass, and length of side window glass, which is already known to the system. Based on these parameters and surrounding information, the system performs calibration after which it can easily generate the side glass view which can be shown on the smart side window glass on the automobile.

In another example, automatic settings based on the aforementioned parameters are determined at the run time for performing the calibration. In this setting, an inside camera continuously captures the outside view from the inside of the automobile. The outside view captured by the inside camera is similar to the view which users see from inside of the automobile. The system processes the view captured from the outside camera and the view captured from the inside camera to generate the side glass view which has to be displayed on the side window glass of the automobile.

In another example, automatic setting and view adjustment is based on head movement of the traveler or user. Similar to the above mentioned case, the parameters are identified at the runtime of the system for performing the calibration. Apart from the view captured from inside camera, head movements and eyes of the user is also identified. The inside camera continuously captures the coordinates of the eyes or head, and based of these coordinates, the side glass view is adjusted i.e. increasing field of vision in the side glass view if the user is near the side glass, and left shift and right shift of side glass view if the user shifts to the right or left side.

Generation of Content

Generating the content which is rendered on the side window glass may include feature selection, feature mapping, parameter estimation, image alignment, and view plane projection. In the feature selection, key feature points are extracted from the captured frame. The features which are extracted can be based on, but are not limited to scale invariant feature transform (SIFT) or sped up robust features (SURF) features. The feature descriptors should be invariant and distinctive. Upon feature selection, the key features (descriptors) obtained will be used to establish correspondence between the frames obtained from the 2D camera and the 360 degree camera. Upon mapping, the parameters are estimated, which include but are not limited to angle, orientation, distances of key feature points with respect to. reference coordinate system, etc. These parameters basically assist in alignment of the frame appropriately to be rendered on the side window glass. Upon estimation, aligning the image with the other parameter which include but not limited to camera parameters, position of eyes of the user and position coordinates of the side window glass, which all act as an input for frame alignment that will eventually be rendered on the side window glass. The frame can eventually be aligned by applying various transforms such as translation, affine, perspective, and warping. The aligned image can finally be projected onto the side window glass based on its shape so as to give a real experience.

Figure 2:
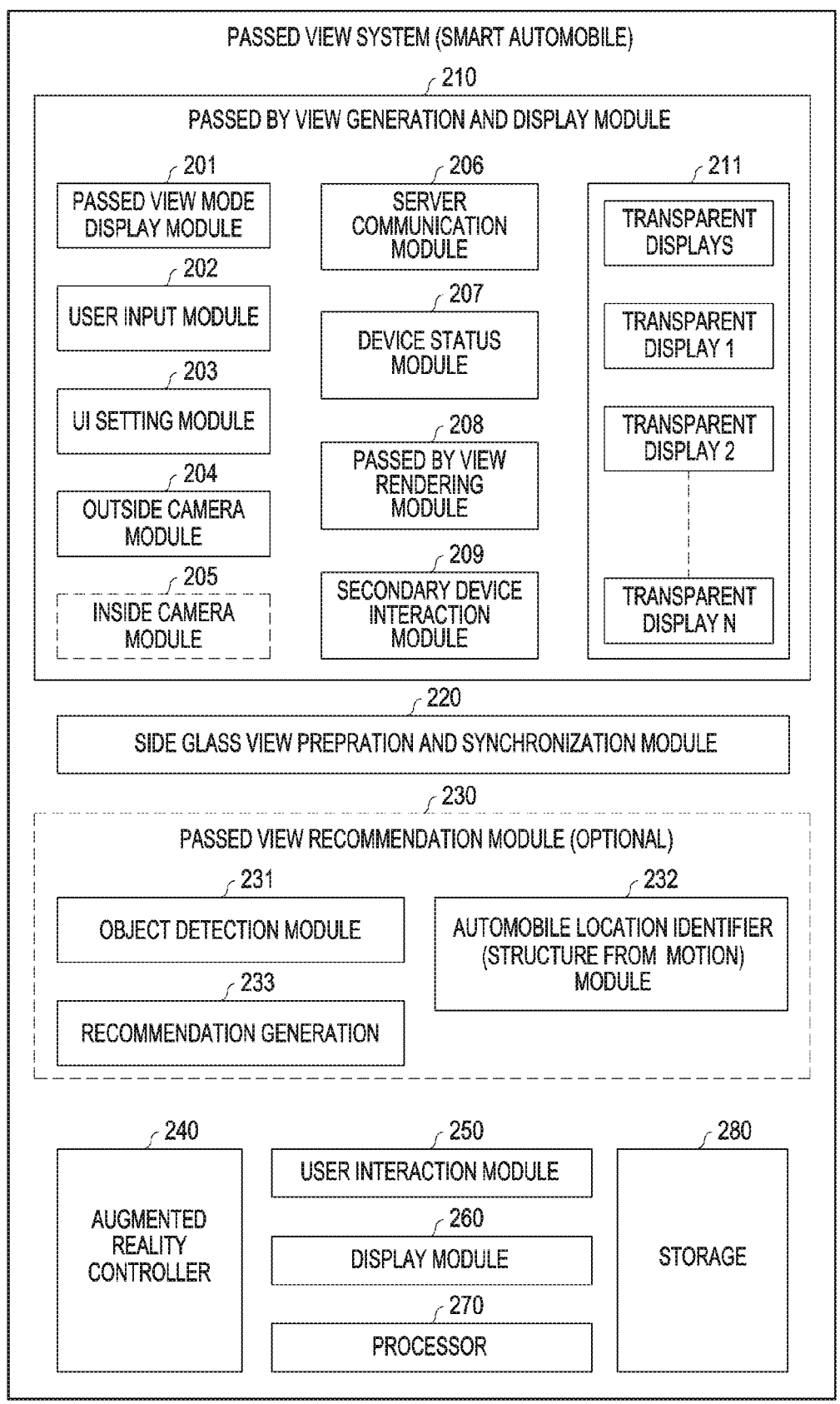
FIG. 2 illustrates a system architecture of processing a captured view to recommend multimedia content on a glass window of a vehicle according to an embodiment.

FIG. 2 illustrates a system architecture of processing a captured view to recommend multimedia content on a glass window of a vehicle according to an embodiment. The system mainly includes a passed by view generation and display module 210, side glass view preparation and synchronization module 220, passed view recommendation module 230, augmented reality controller 240, user interaction module 250, display module 260, processor 270 and a storage 280.

The passed by view generation and display module 210 includes passed view mode display module 201, user input module 202, UI setting module 203, outside camera module 204, inside camera module 205, server communication module 206, device status module 207, passed by view rendering module 208, secondary device interaction module 209 and transparent displays 211.

The passed view mode display module 201 is responsible for displaying the passed by view on side window glass. The user input module 202 detects user input and perform the corresponding action associated with the user input. The user input can be a simple touch on the smart window glass, eye gaze, head movement, voice input, or gesture, for example. The UI setting module 203 is provided with a UI which the user can manipulate according to preferences, and which is responsible for saving the user's preferred user interface. The outside camera module 204 is associated with the outside cameras of the automobile and continuously captures the outside view and stores this view in the automobile's storage. The inside camera module 205 is responsible for detecting head movement, gesture, and eye gaze of the user inside the automobile. The user input is passed to the user input module and suitable action is performed.

The server communication module 206 interacts with the server for retrieving information related to the outside environment, providing recommendation information for manipulating an outside view, such as by adding overlaid information, and saving data on the cloud. The device status module 207 continuously checks all the devices and modules which are necessary for the passed view mode. If any module is not working correctly, the device status module 207 gives a warning to the user on the side window glass or on the user device. The passed by view rendering module 208 is responsible for rendering the passed by view on the display device. The secondary device interaction module 209 interacts with the secondary devices of a user i.e. mobile device, laptop, or tablet. The transparent displays 211 are smart window glasses of the automobile on which information and a passed view are shown.

The side glass view preparation and synchronization module 220 takes the recorded content of a passed view and creates the side glass point view content. This module also synchronizes the content to give the user the effect of visualizing the same passed view again from the same point of reference.

The passed view recommendation module 230 includes an object detection module 231, an automobile location identifier 232 and a recommendation generation module 233. The object detection module 231 detects the objects present in the surroundings of the automobile to identify the location markers i.e. monuments and buildings. The automobile location identifier 232 identifies/extract the information of the automobile location from a global positioning system (GPS) device. The recommendation generation module 233 is responsible for retrieving the recommendation from server to visualize passed by view. The recommendation is based on other travelers views from different automobiles. The recommendations are shown automatically on the side window glasses which user can select and view.

The processor 270 executes the processes required for the passed-by-view mode system, and may control operations of modules included in the passed-by-view mode system. Thus, the operations of the passed-by-view mode system may be interpreted as being substantially controlled and performed by the processor 270. The storage 280 is where the surrounding contents are stored and processed passed view for side windows are stored.

Figure 3:
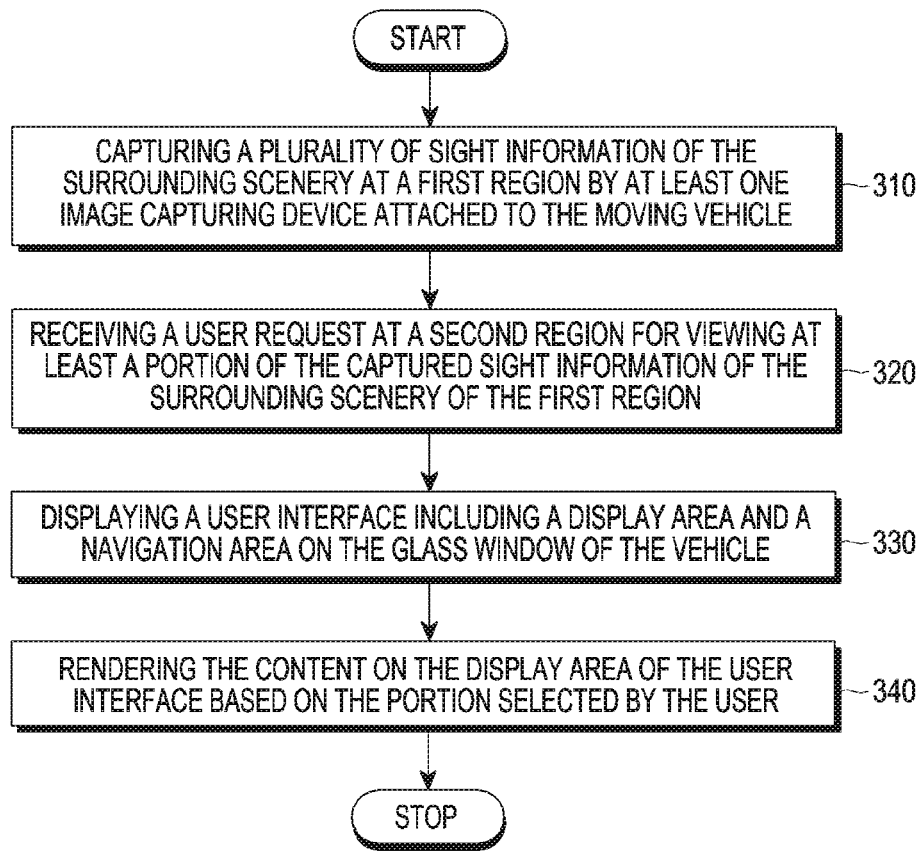
FIG. 3 illustrates a method of displaying multimedia content on a glass window of a vehicle according to an embodiment.

FIG. 3 illustrates a method of displaying multimedia content on a glass window of a vehicle according to an embodiment.

In step 310, a plurality of sight information of the surrounding scenery is captured at a first region using one or more image capturing device attached to the moving vehicle. The sight information may be a sight image of the surrounding scenery. The method continuously captures images from the surrounding environment as the vehicle proceeds through several geographical locations. Along the path of the vehicle, the image capturing device which includes at least one of a three-dimensional camera and a two-dimensional camera tracks the various objects existing around the vehicle though several geographical locations and stores the same locally or transmits the same to the remote server.

The camera may be attached to each glass window or a 360 degree camera mounted on the vehicle. The plurality of sight information may include but is not limited to a place, scenery, animal, and a building, and may be transmitted to a remote server for the identification of various interesting objects in the captured sight information. The processed content is returned for displaying on the glass window for user selection. The first region has sight information which is captured by the image capturing device/s at a definite time period, such as from time T=0 to T=10 seconds.

In step 320, a user request is received at a second region for viewing at least a portion of the captured sight information of the surrounding scenery of the first region. The second region is where the vehicle has passed some distance from the first region, such as at time T=60 seconds, and is where the user makes a request to perceive the passed view information of the first region.

In step 330, a user interface is displayed including a display area and a navigation area on the glass window of the vehicle upon receiving a request from the user. The user interface enables the user to select at least one captured sight information to visualize. The navigation area provides a pointer related to the portion of the captured sight information of the first region. The navigation area may also include a seek bar interface which facilitates and controls viewing of a just passed view, or a view that was missed due to vehicle speed.

In step 340, the content is rendered on the display area of the user interface based on the portion selected by the user. Once the user requests which portion of the content to be display on the glass window of the vehicle, the content is rendered for viewing. The rendered content is based on a pre-processed sight information of the surrounding scenery corresponding to the glass window of the vehicle. The display area provides a passed object based view selection, famous building and their icon based view selection, other side window view, drag interaction for enabling passed view, switching passed view and current view display, selection of a passed view by interacting on the route map, default time for starting the passed by view, controlling the speed of displaying the passed view, sharing the passed view on a social network with a single click, zoom in and out of the passed view, and information about the objects in the passed by view. The display of the sight information on the glass window is of a non-transparent view, and depicts the same view to the user as if the vehicle would have been in the surrounding environment.

The generation of pre-processed sight information is calibrated based on the size or shape of the window, distance of the window glass from the camera including outside camera and the inside camera, and the sight information of the surrounding scenery. The calibration assists in viewing the surrounding environment seen on the display exactly as the scene was viewed by the user on the transparent glass while travelling. Due to this, the user can easily recall what was seen as the transparent glass view and display view will be very similar. The generation of pre-processed sight information is determined at the run time based on the size or shape of the window, distance of the window glass from at least two image capturing devices, a first image capturing device which is at installed indoor of the vehicle and a second image capturing device which is outside of the vehicle. The generation of pre-processed sight information is determined at the run time based on the size or shape of the window, distance of the window glass from at least two image capturing devices, a first image capturing device which is installed indoor of the vehicle and a second image capturing device which is mounted outside of the vehicle, wherein the indoor capturing device continuously captures the coordinates of the eyes or head of the user to emulate the rendering content to display on the glass window based on the user movements.

Figure 4:
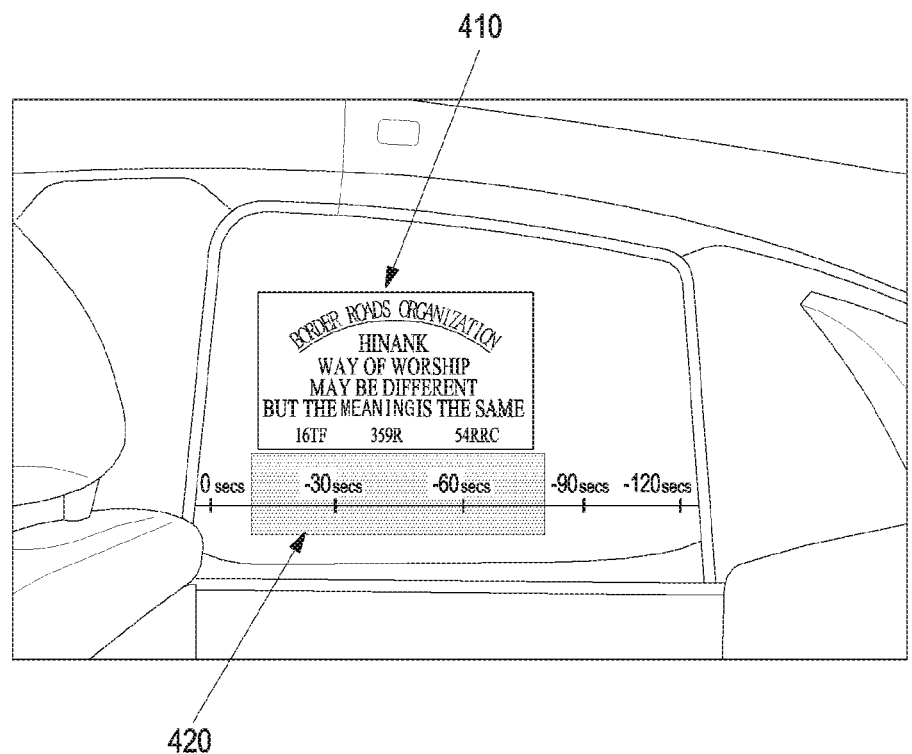
FIG. 4 illustrates an example view of a display area and a navigation area of a user interface as discussed in FIG. 3 according to an embodiment.

FIG. 4 illustrates an example view of a display area 410 and a navigation area 420 of a user interface as discussed in FIG. 3 according to an embodiment. The display area provides 410 a view which has been passed-by during the drive. The navigation area 420 which provides a series of time intervals, such as 0 seconds, −30 seconds, −60 seconds, −90 seconds and −120 seconds, and facilitates the user to select the respective time period the traveler would like to view which has been passed by during the drive.

Figure 5:
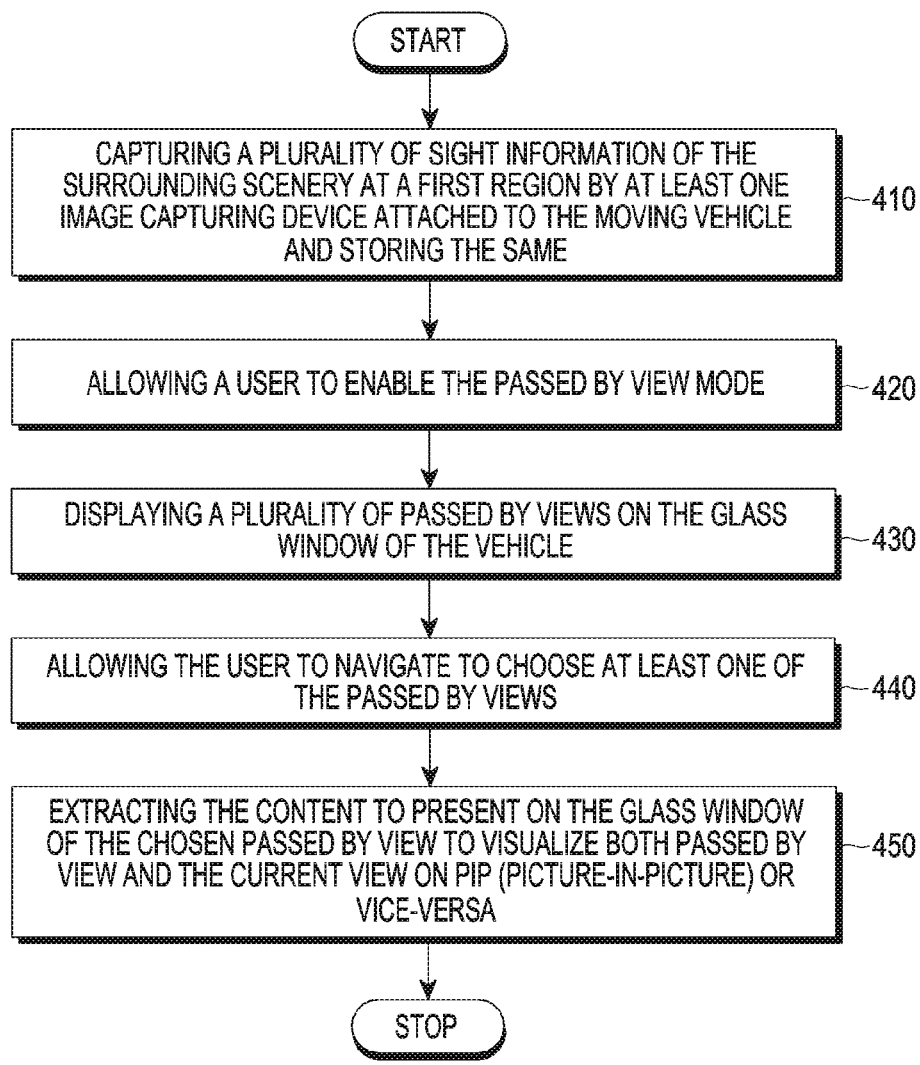
FIG. 5 illustrates a method of displaying multimedia content on a glass window of a vehicle, where the display provides a passed by view and current view in picture in picture (PIP) according to an embodiment.

FIG. 5 illustrates a method of displaying multimedia content on a glass window of a vehicle, where the display provides a passed by view and current view in PIP according to an embodiment.

In step 510, a plurality of sight information of the surrounding scenery is captured at a first region by at least one image capturing device attached to the moving vehicle and storing the same.

In step 520, the user is permitted to enable the passed by view mode. That is, the user is permitted to touch the window glass at least once to display the option of a passed by view mode. Upon selection of the option of the passed by view mode, a plurality of passed by views is displayed on the glass window of the vehicle in step 530.

In step 540, the user is enabled to navigate to choose at least one of the passed by views. The user is provided with an option to choose at least one passed by view in order to visualize. The speed of the visualized passed by view is be controlled by various touch commands on the glass window for the action of slow, fast, and pausing of the view, wherein the touch commands include but are not limited to tap, press, double tap, drag and pinch.

In step 550, the content is extracted to be presented on the glass window of the chosen passed by view to enable the traveler to visualize both the passed by view and the current view in PIP or vice-versa. The presentation of the chosen passed by view in the glass window is of a semi-transparent interface, in which both a chosen passed view and the current view are simultaneously displayed. The semi-transparent interface includes the transparent view and of display, wherein the transparent view is a substantially larger view and the display is a smaller view. The transparent view is a natural view and the display view is a digital view.

The transparent view may be a substantially smaller view than the display, which may be a larger view, and the transparent view and the display may both be digital views.

Figure 6:
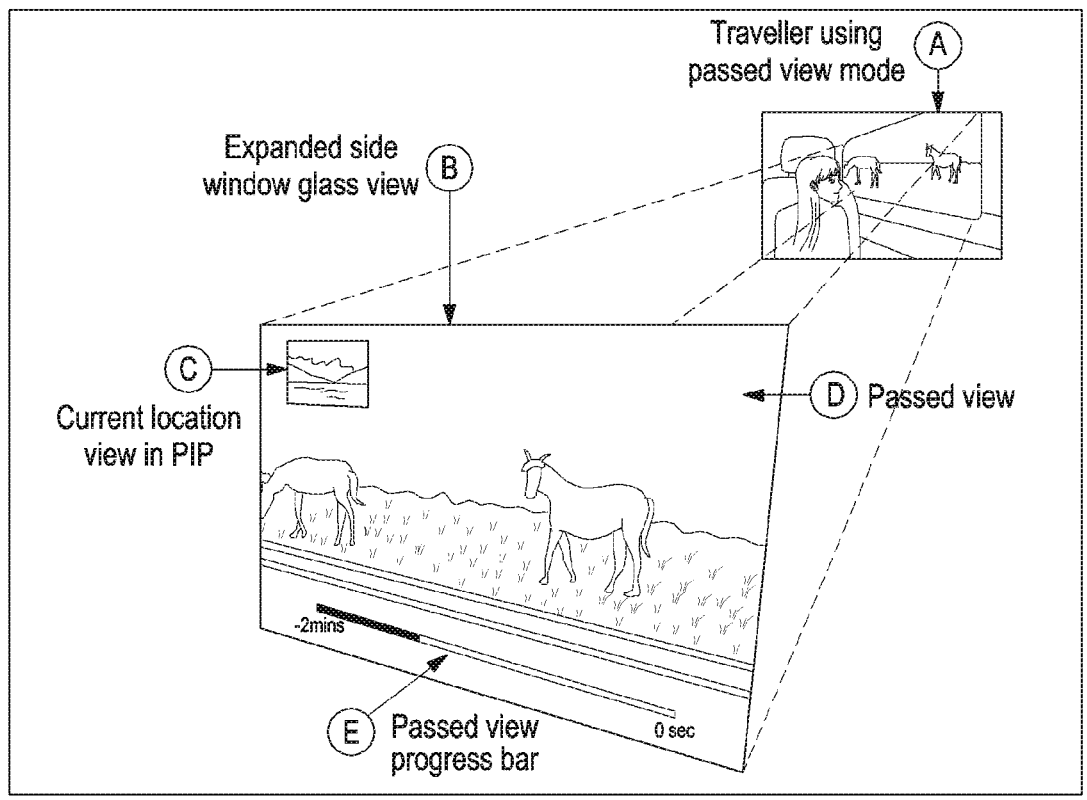
FIG. 6 illustrates an example view of a passed by view and current view in PIP as discussed in FIG. 5 according to an embodiment.

FIG. 6 illustrates an example view of an expanded side window glass view (B) including a passed by view and current view in PIP as discussed in FIG. 5 according to an embodiment. Considering a scenario as depicted in FIG. 6, the traveler/user is travelling in a car and was unable to properly view the horses due to the speed of the vehicle. The user then selects the passed by view mode (A) for visualizing the preferred outside view. The window glass display provides a current view in PIP (C) along with the passed view (D) in PIP format, so that user is aware of the current view as well. Along with the passed view, a progress bar (E) is also shown which describes the current position of a passed view relative to the vehicle's current view. The user can also click on this progress bar to control the viewing, e.g., to jump back and forth to visualize the passed by view. The progress bar is played on a reverse side of the car end which assists the user to achieve a real feel of returning to a previous missed view and understanding the scale.

Figure 7:
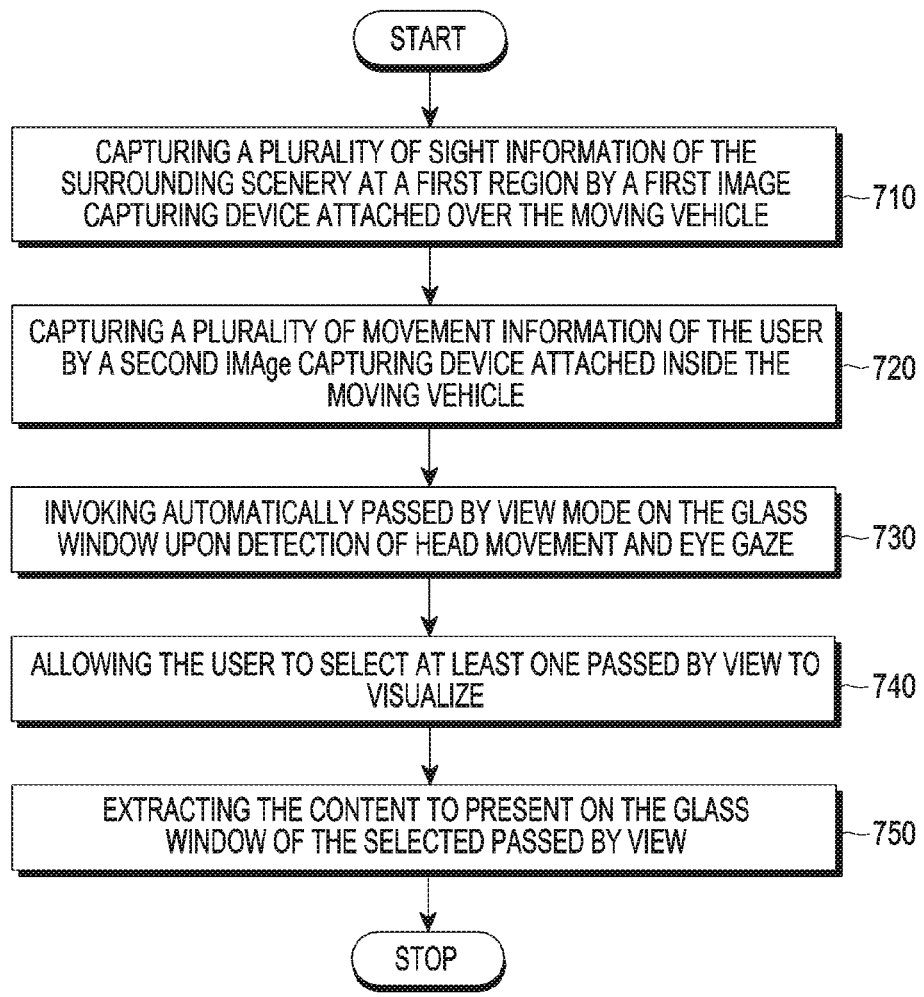
FIG. 7 illustrates a method of displaying multimedia content on a glass window of a vehicle by activating the invocation of a passed by view mode after detecting head movement towards the passing view according to an embodiment.

FIG. 7 illustrates a method of displaying multimedia content on a glass window of a vehicle by activating the invocation of a passed by view mode after detecting head movement towards the passing view according to an embodiment.

In step 710, a plurality of sight information of the surrounding scenery is captured at a first region by a first image capturing device attached over the moving vehicle. The first image capturing devices is a 3-dimensional 360 degree camera which is mounted on the vehicle in order to capture the surrounding scenery along the route of the vehicle.

In step 720, a plurality of movement information of the user is captured by a second image capturing device attached inside the moving vehicle. The second image capturing device is a 2-dimensional camera which is installed indoor of the vehicle. or may be a 3-dimensional camera.

In step 730, the automatically passed by view mode is invoked on the glass window upon detection of head movement and eye gaze. The second image capturing device which is attached to the indoor of the vehicle continuously monitors the movement of the user, and detects his/her head movement and the eye gaze of the user when the movement may be directed towards the side glass in order to view the passed view which is of interest to the user. Upon detection, the passed view mode is automatically invoked on the side glass window.

In step 740, the user is enabled to select at least one passed by view to visualize. Once the passed view mode is turned on, the user is provided with various options from which the user may select to visualize the passed view.

In step 750, the content is extracted to be presented on the glass window of the selected passed by view. Upon selection from the various options, the system or method extracts the contents to present the view to the user.

Figure 8A:
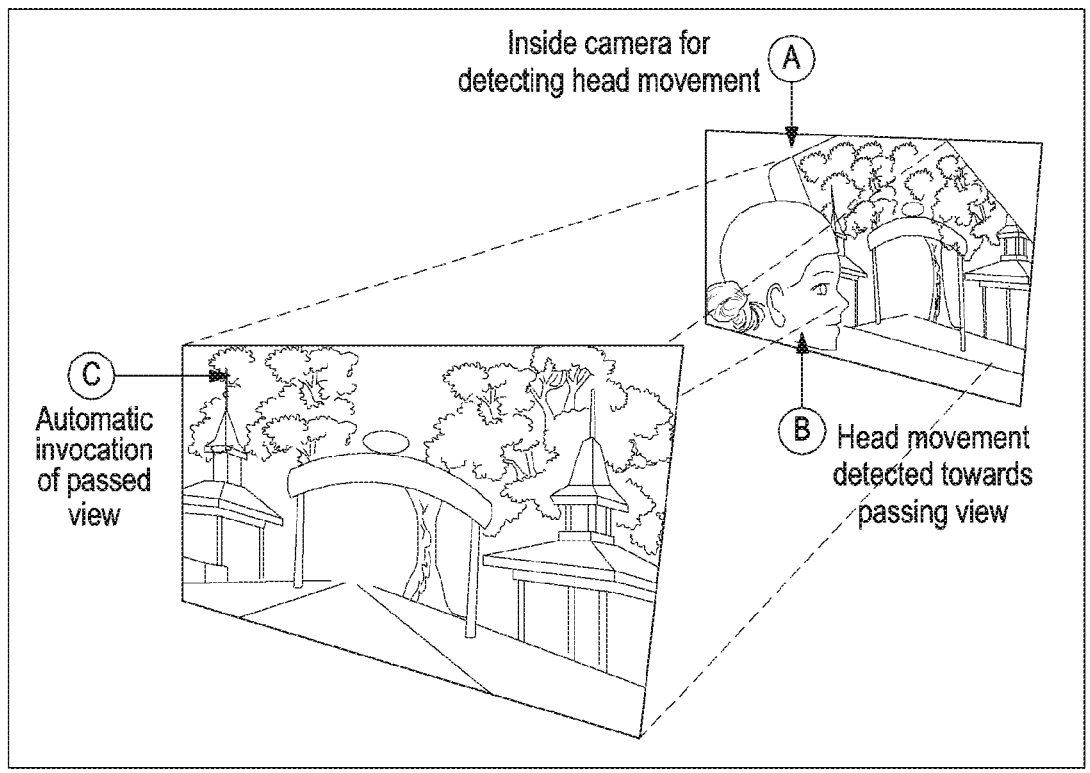
FIG. 8A illustrates an example view automatic invocation of a passed by view mode as discussed in FIG. 7 according to an embodiment.

FIG. 8A illustrates an example view automatic invocation of a passed by view mode as discussed in FIG. 7 according to an embodiment. In FIG. 8A, the user is moving or leaning his/her head towards the passing view in order to clearly see a view of interest to the user (A). As the user movement is detected by the inside camera of the system (B), the method automatically invokes the passed by view mode and present to the user (C). The user can then select the view for which user was intent to see clearly, and because of the speed of the car, the user was unable to view properly or clearly and now which can be visualized clearly. Various user interface (UI) options can then be provided based on the detection of head movement towards the passing view. In another example embodiment, eye gaze can also be used in automatic invocation of a passed by view mode. The eye gaze towards the passing view can also be detected using the inside camera of the system.

Figure 8B:
FIG. 8B illustrates an example side window touch option for using the passed view according to an embodiment.

FIG. 8B illustrates an example side window touch option for using the passed view according to an embodiment. The example side window touch options provides various commands in visualizing passed view. The commands include (1) Tap command, where a user can enable the passed view mode on the side window glass, (2) Press command, where a user can select option on the window display, (3) Double Tap command, where a user can pause and play the passed view, (4) Drag command, where a user has the control of the view, such as forward and backward control, (5) Pinch command, where a user can have access to passed view, full screen, or current view. The above mentioned commands with the touch option are given as examples, and there may be various other options inputs in order to view the passed view on the side window glass.

Figure 9:
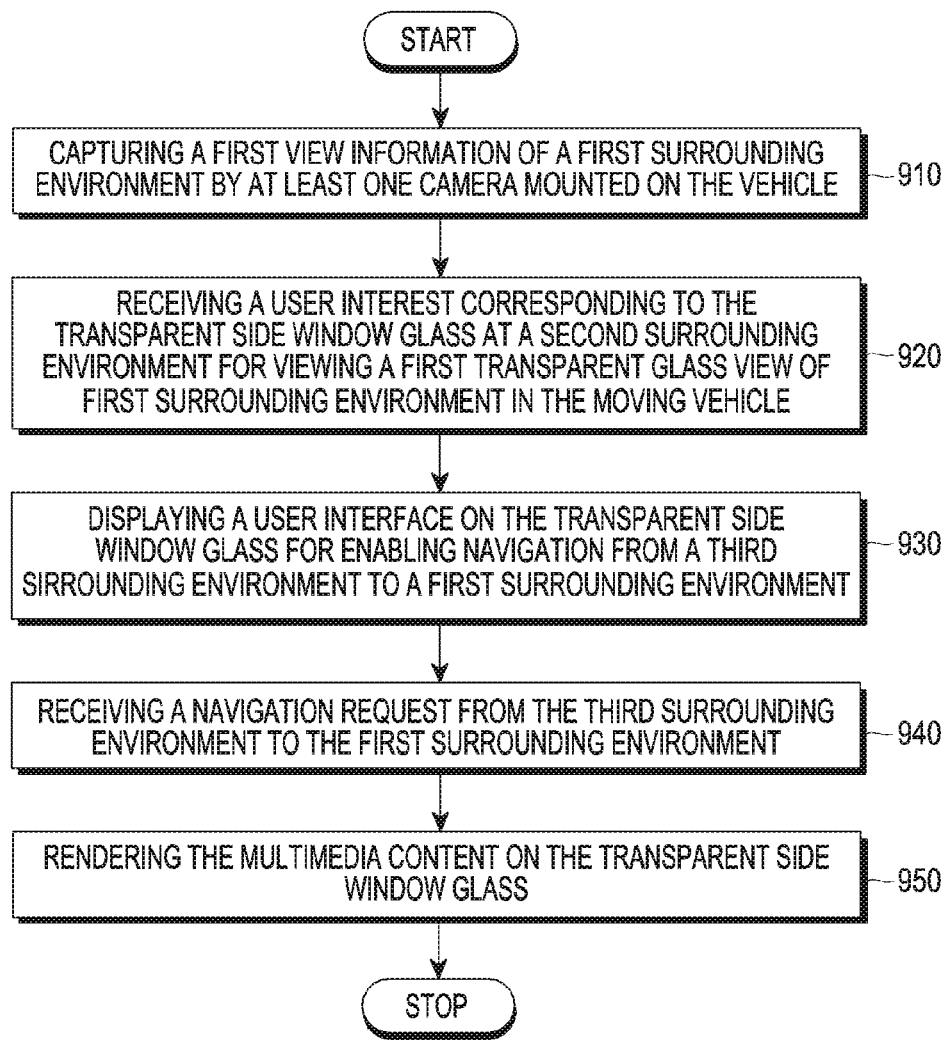
FIG. 9 illustrates a method of displaying multimedia content on a glass window of a vehicle moving from a first surrounding environment to a second surrounding environment according to an embodiment.

FIG. 9 illustrates a method of displaying multimedia content on a glass window of a vehicle moving from a first surrounding environment to a second surrounding environment according to an embodiment.

In step 910, first view information of a first surrounding environment is captured by at least one camera mounted on the vehicle. The capturing or recording is performed using at least one of a 2D camera and a 360 degree camera.

As the camera continuously captures the view information, where each piece of the captured view information is provided with a time stamp and is stored in the storage for further processing, the captured information with the time stamp is transmitted by the vehicle processor to a remote server for storage and processing. The first surrounding environment is when the vehicle is at T=0 seconds.

In step 920, a user interest request is received corresponding to the transparent side window glass at a second surrounding environment for viewing a first transparent glass view of first surrounding environment in the moving vehicle. The second surround environment is at the instance when the vehicle is at T=120 seconds. The first surrounding environment is travelled earlier and the second surrounding environment is travelled later by the moving vehicle on the drive.

In step 930, a user interface is displayed on the transparent side window glass for enabling navigation from a third surrounding environment to a first surrounding environment. The third surrounding environment is at the instance when the vehicle is at T=60 seconds, and is travelled earlier and the second surrounding environment is travelled later by the moving vehicle on the drive.

In step 940, a navigation request is received from the third surrounding environment to the first surrounding environment. The user makes such a request based on the various options which were provided by the glass window. The options may include various sections of the passed view with relevant scenery, where the various sections are based on the time slots such as −30 seconds, −60 seconds, −90 seconds, and −120 seconds. For example, the user can provide his/her navigation request that he/she wants to view the passed view images or information from −90 seconds to −120 seconds, where −90 seconds is the third environment and −120 seconds is the first environment. Receiving user interest corresponding to the transparent side window glass is provided using at least one of but not limited to touch gesture, voice command, body posture gesture, and eye gaze gesture.

In step 950, the multimedia content is rendered on the transparent side window glass, and is prepared corresponding to the transparent side window glass after processing the first view information, based on at least one of but not limited to size of the transparent window glass, shape of the transparent window glass, user sitting position, user eye position, and mapping results of the first transparent glass view with the first view information.

Figure 10:
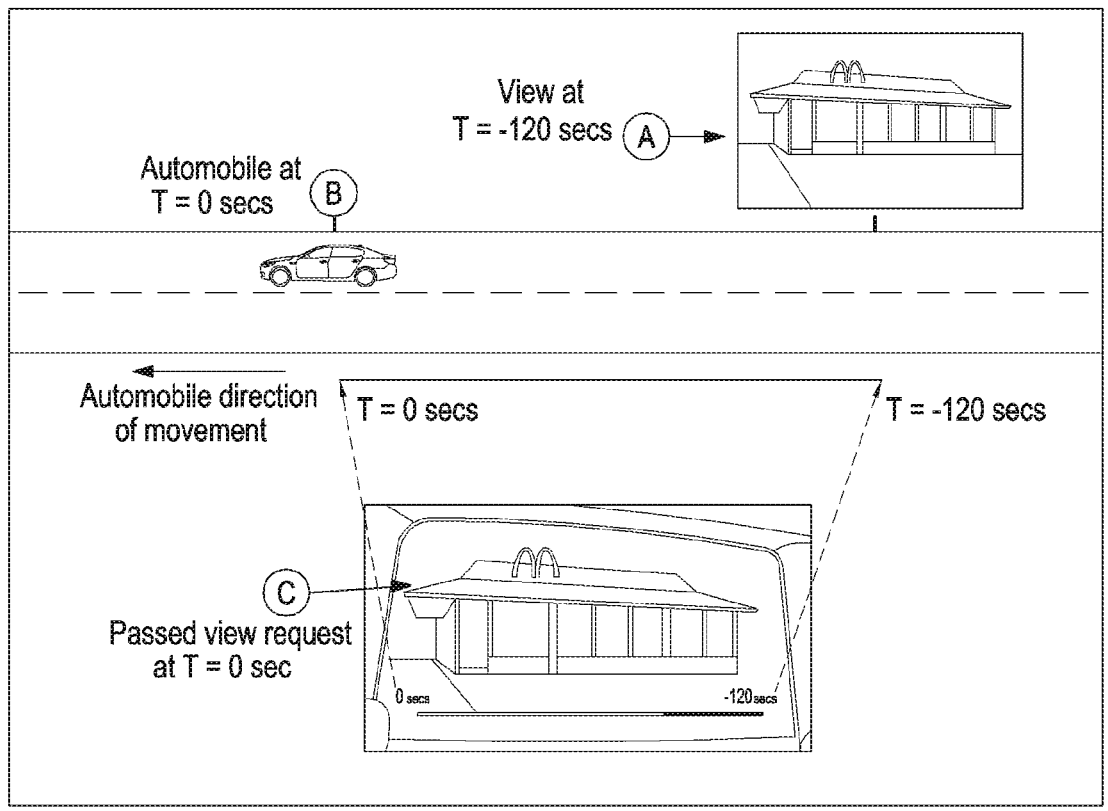
FIG. 10 illustrates an example scenario where a vehicle moving from a first surrounding environment to a second surrounding environment as discussed in FIG. 9 according to an embodiment.

FIG. 10 illustrates an example scenario where a vehicle moving from a first surrounding environment to a second surrounding environment as discussed in FIG. 9 according to an embodiment. FIG. 10 illustrates automobile at T=0 sec and users provide a request to view the passed view. Once the request passed the side window glass view is started from T=−120 sec, which is configurable and can be different based on the passed view selection, the progress bar illustrates the progress of a passed view towards the current view and unseen view in the current scenario. The user can further click on the progress bar to quickly jump from one view to another view.

Figure 11:
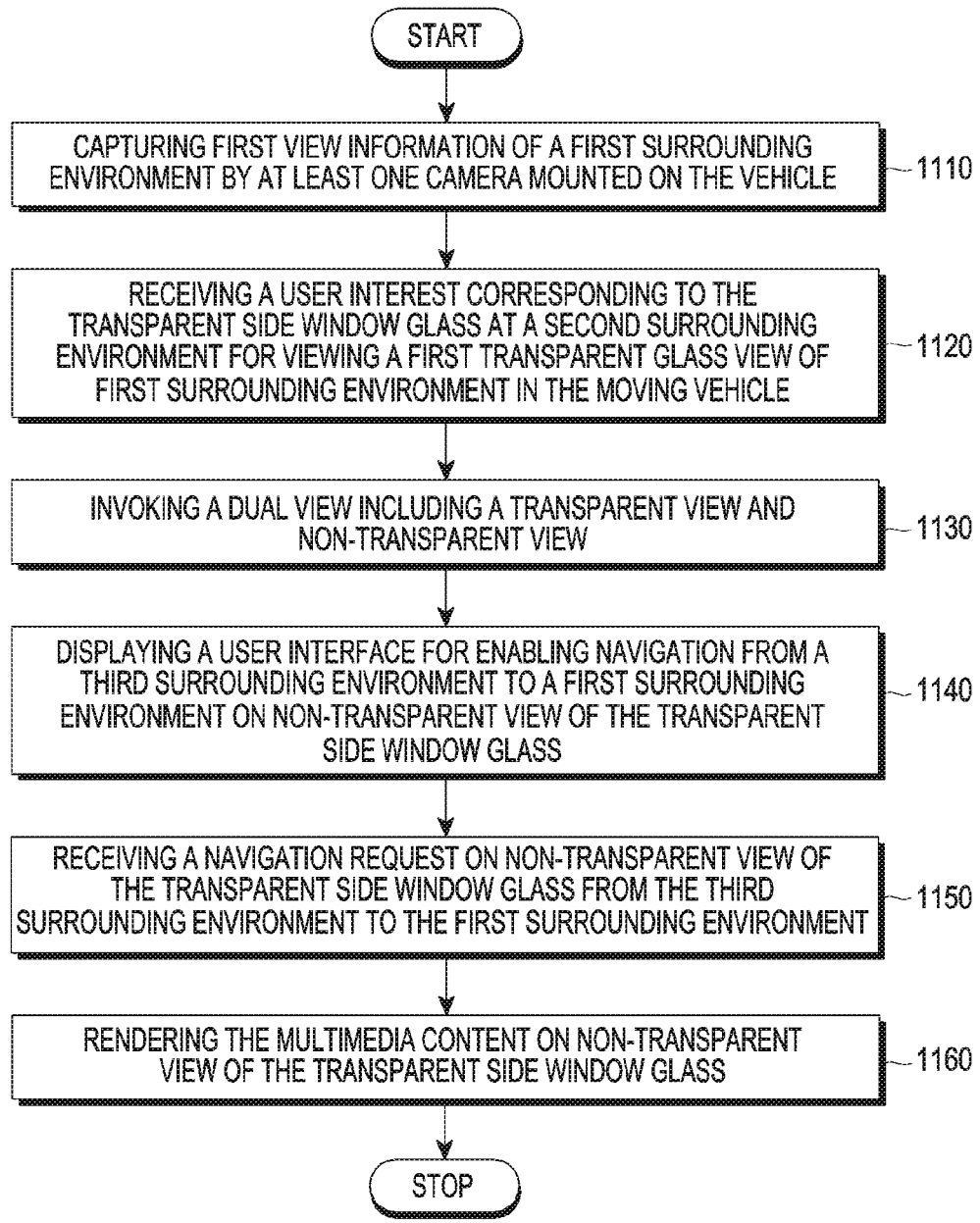
FIG. 11 illustrates a method of displaying multimedia content on a glass window of a vehicle, where the display provides a dual view including a transparent view and non-transparent view according to an embodiment.

FIG. 11 illustrates a method of displaying multimedia content on a glass window of a vehicle, where the display provides a dual view including a transparent view and non-transparent view according to an embodiment.

In step 1110, first view information of a first surrounding environment is captured by at least one camera mounted on the vehicle.

In step 1120, a user interest is received corresponding to the transparent side window glass at a second surrounding environment for viewing a first transparent glass view of first surrounding environment in the moving vehicle. The first surrounding environment, such as T=−120 seconds, is travelled earlier and the second surrounding environment, such as T=60 seconds, is travelled later by the moving vehicle on the drive.

In step 1130, a dual view is invoked including a transparent view and non-transparent view.

In step 1140, a user interface for enabling navigation from a third surrounding environment to a first surrounding environment is displayed on non-transparent view of the transparent side window glass. The third surrounding environment, such as T=0 seconds, is travelled earlier and the second surrounding environment, such as T=60 seconds, is travelled later by the moving vehicle on the drive.

In step 1150, a navigation request is received on non-transparent view of the transparent side window glass from the third surrounding environment to the first surrounding environment.

In step 1160, the multimedia content is rendered on non-transparent view of the transparent side window glass, and is prepared corresponding to the transparent side window glass after processing the first view information. The multimedia content is at least one of a 2D image, 360 degree image, 2D video, and 360 degree video. The multimedia content is rendered based on at least one size or shape of the transparent window glass, user sitting position, user eye position and mapping results of the first transparent glass view with the first view information.

Figure 12:
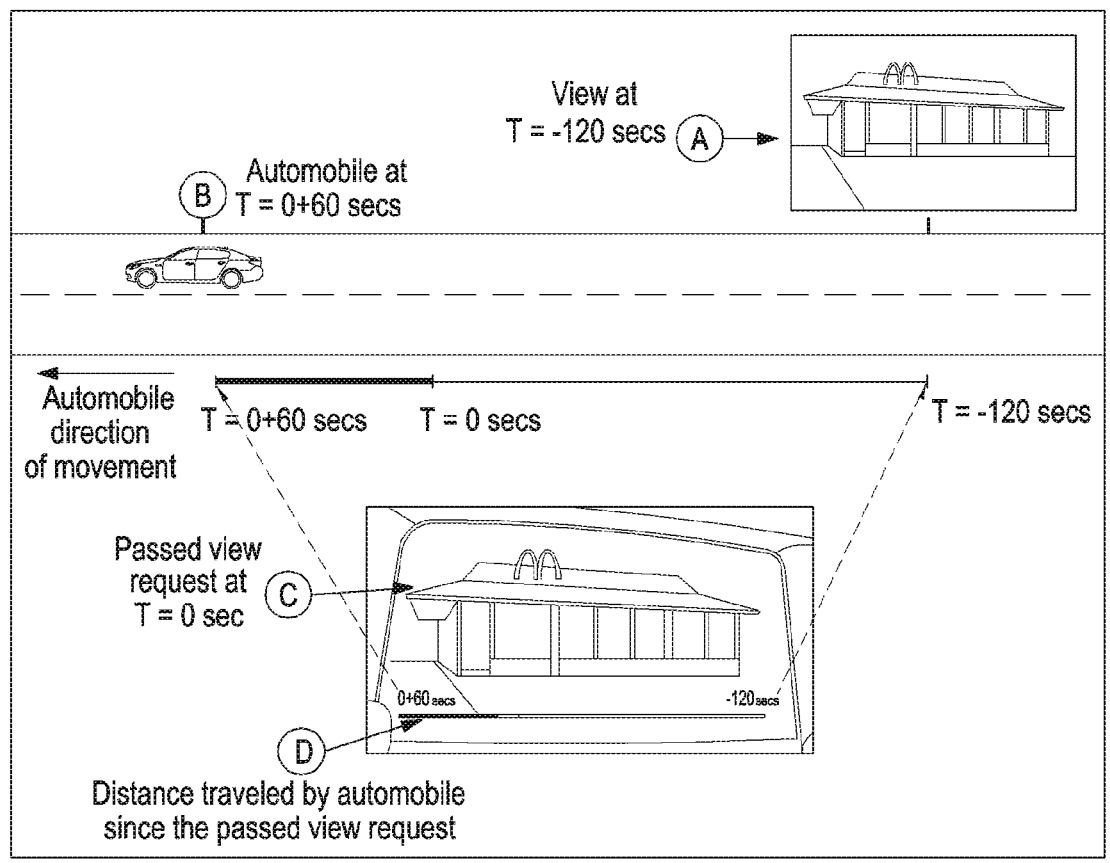
FIG. 12 illustrates an example scenario where the distance travelled by vehicle since the passed view is requested (i.e. from T=0 sec to T=60 sec) according to an embodiment.

FIG. 12 illustrates an example scenario where the display provides a dual view including a transparent view and non-transparent view as discussed in FIG. 11 according to an embodiment. FIG. 12 illustrates where the automobile is in motion from T=−120 sec (A) to T=0+60 sec (B). The progress bar changes are depicted in the figure which illustrates the progress of a passed view towards the current view and also illustrates an unseen view in a current scenario. The progress bar illustrates the distance moved (D) since the passed view request (C) is provided. Different color coding may also be used to depict the above or other scenarios.

Figure 13:
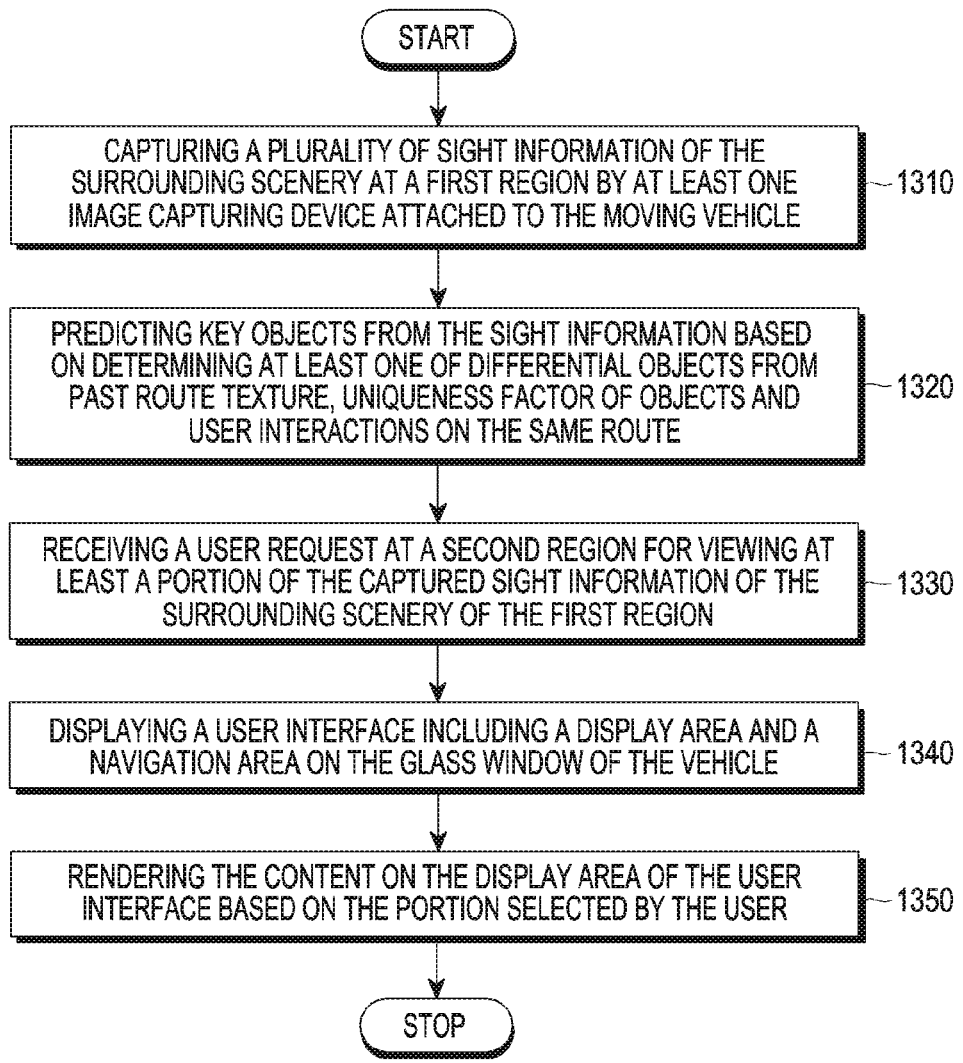
FIG. 13 illustrates a method of displaying multimedia content on a glass window of a vehicle by predicting key objects from the sight information according to an embodiment.

FIG. 13 illustrates a method of displaying multimedia content on a glass window of a vehicle by predicting key objects from the sight information according to an embodiment.

In step 1310, a plurality of sight information of the surrounding scenery at a first region is captured by at least one image capturing device attached to the moving vehicle.

In step 1320, key objects from the sight information are predicted based on determining at least one of differential objects from past route textures, and a uniqueness factor of objects and user interactions on the same route. The step of predicting key objects uses optical flow and feature similarity between frames, and the identification of texture (contextual background) in the selected grids for key object detection based on global feature (GIST feature) similarity. The key objects are predicted by a method including but not limited to identifying and analyzing the key objects in the grid based on saliency. The saliency can be based on learning about objects that have not been reached in the past route, a motion, and object similarity based on an AI model, for example. Predicting key objects is based on the classification of the scene grid cells into object and non-object (texture) parts to obtain the key objects present in the captured scene. Analyzing the key objects includes checking and discarding the frequently occurring objects, and once a different object appears, marking it as differential object for further processing.

The past user interactions with the glass window are captured on various vehicles which are collected at a remote server. Trend data is prepared based on the collected information. Capturing past user interaction includes user profile, user's past viewing & interaction history with the window glass, and user's driving reason/context, for example. A UI window is chosen based on the confidence factor on the differential objects determined by AI. The user interface provides captured sight information dynamically based on the predetermined objects and a user's context, wherein the display of the sight information includes at least one of the image or video display and video starting time.

The user interface provides future view sight information on the route to the user, the future view sight information is retrieved using internet media content. The texture change detection includes division of each frame into N×N grid cells, estimating GIST features for each N×N grid cells of current & previous frames, comparing GIST feature similarity of each grid cell of a current frame with each grid cell of a previous frame, grid cells are marked as similar if feature similarity is greater than a threshold (s) and non-similar grids are selected for further identification of key objects.

In step 1330, a user request is received at a second region for viewing at least a portion of the captured sight information of the surrounding scenery of the first region.

In step 1340, a user interface is displayed including a display area and a navigation area on the glass window of the vehicle. The navigation area provides a pointer related to the portion of the captured sight information of the first region.

In step 1350, the content is rendered on the display area of the user interface based on the portion selected by the user.

Figure 14:
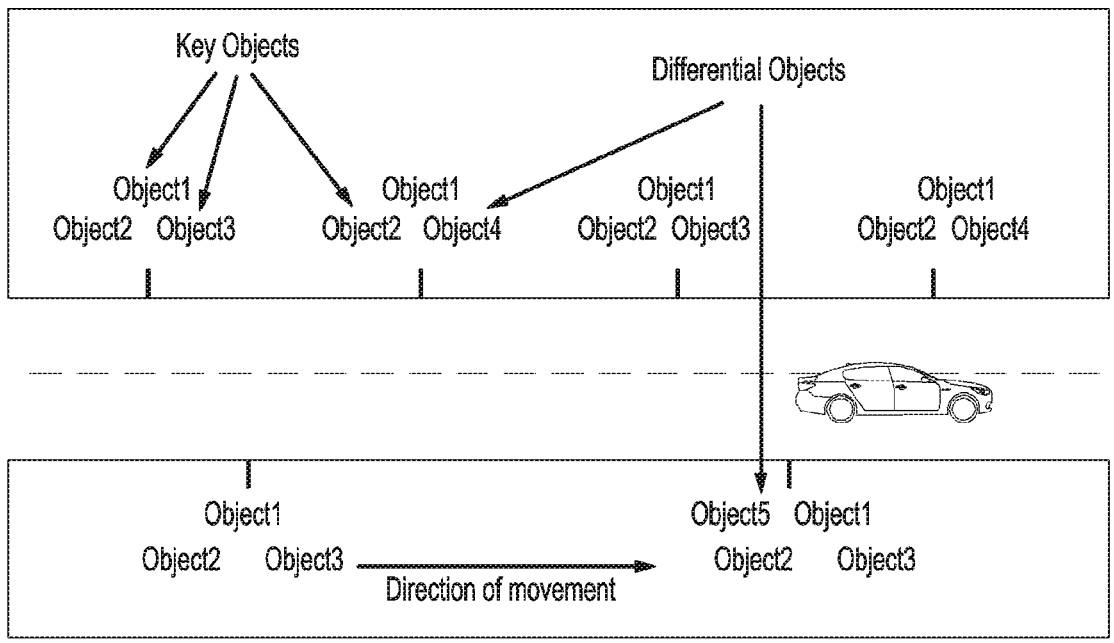
FIG. 14 illustrates an example of key objects and differential objects in the route of the vehicle according to an embodiment.

FIG. 14 illustrates an example of key objects and differential objects in the route of the vehicle according to an embodiment. The differential object is defined as a key object which is infrequent in past view and thus has high importance. The frequently occurring objects are checked and discarded. Once a different object appears, the system marks it as differential object for further processing. For example, a tree can be less important in one travel path, yet may be important in another travel path. Table 1 appears as follows:

TABLE 1

| S. No. | Objects on the Route | Frequency |
|---|---|---|
| 1 | Object 1 | 6 |
| 2 | Object 2 | 6 |
| 3 | Object 3 | 4 |

TABLE 1-continued

| S. No. | Objects on the Route | Frequency |
|---|---|---|
| 4 | Object 4 | 2 |
| 5 | Object 5 | 1 |

Importance of key object α (1/frequency)
Important Key Objects = Differential Objects In Table 1, Object 1, Object 2, Object 3, Object 4, and Object 5 have frequencies of 6, 6, 4, 2 and 1, respectively. Object 1, Object 2 and Object 3 which have relatively higher frequencies, can be identified as key Objects. Object 4 and Object 5 which have relatively lower frequencies, can be identified as differential Objects.

Figure 15:
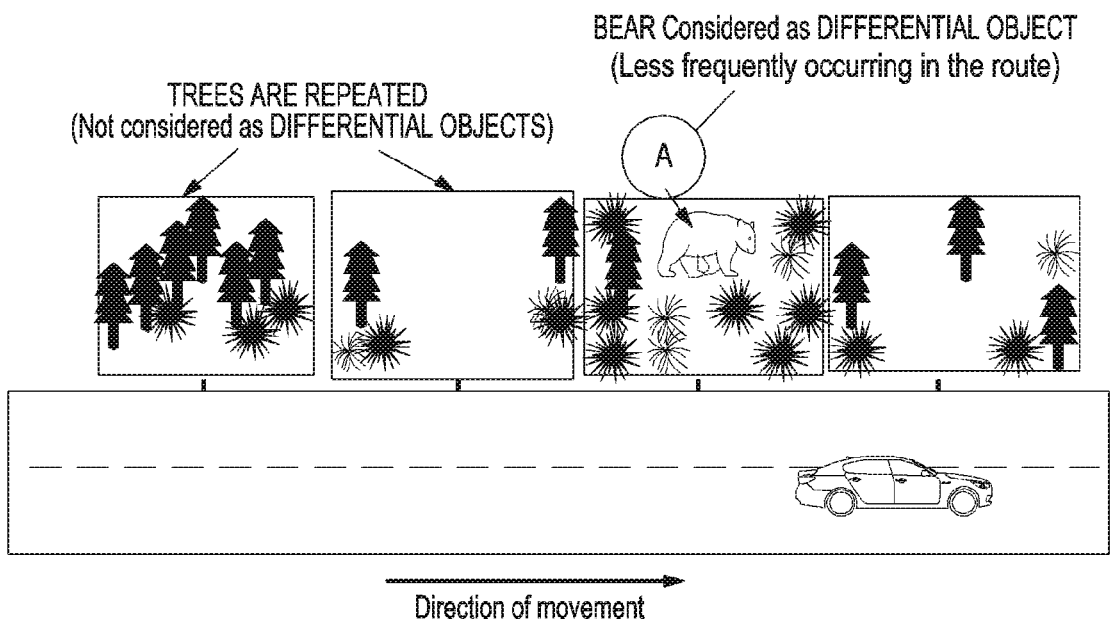
FIG. 15 illustrates an example on identification of differential objects in the rout of the vehicle according to an embodiment.

FIG. 15 illustrates an example of identification of differential objects in the route of the vehicle according to an embodiment. The method herein analyzes the route texture and determines differential objects. As illustrated, there are various images which are considered by the method in order to determine and differentiate between the key object and the differential objects. For example, in FIG. 15, the bear is considered as a differential object. Due to different color values of the bear and background, the bear is likely to be analyzed, and the bear less frequently occurs in the route. As such, the bear is considered to be the differential object. Whereas, the trees are repeated, and as such, are not considered as differential objects. Differential objects that are rare in the passed view and key objects are identified based on a texture change and are not selected as differential objects as they are repetitive in several frames.

Figure 16:
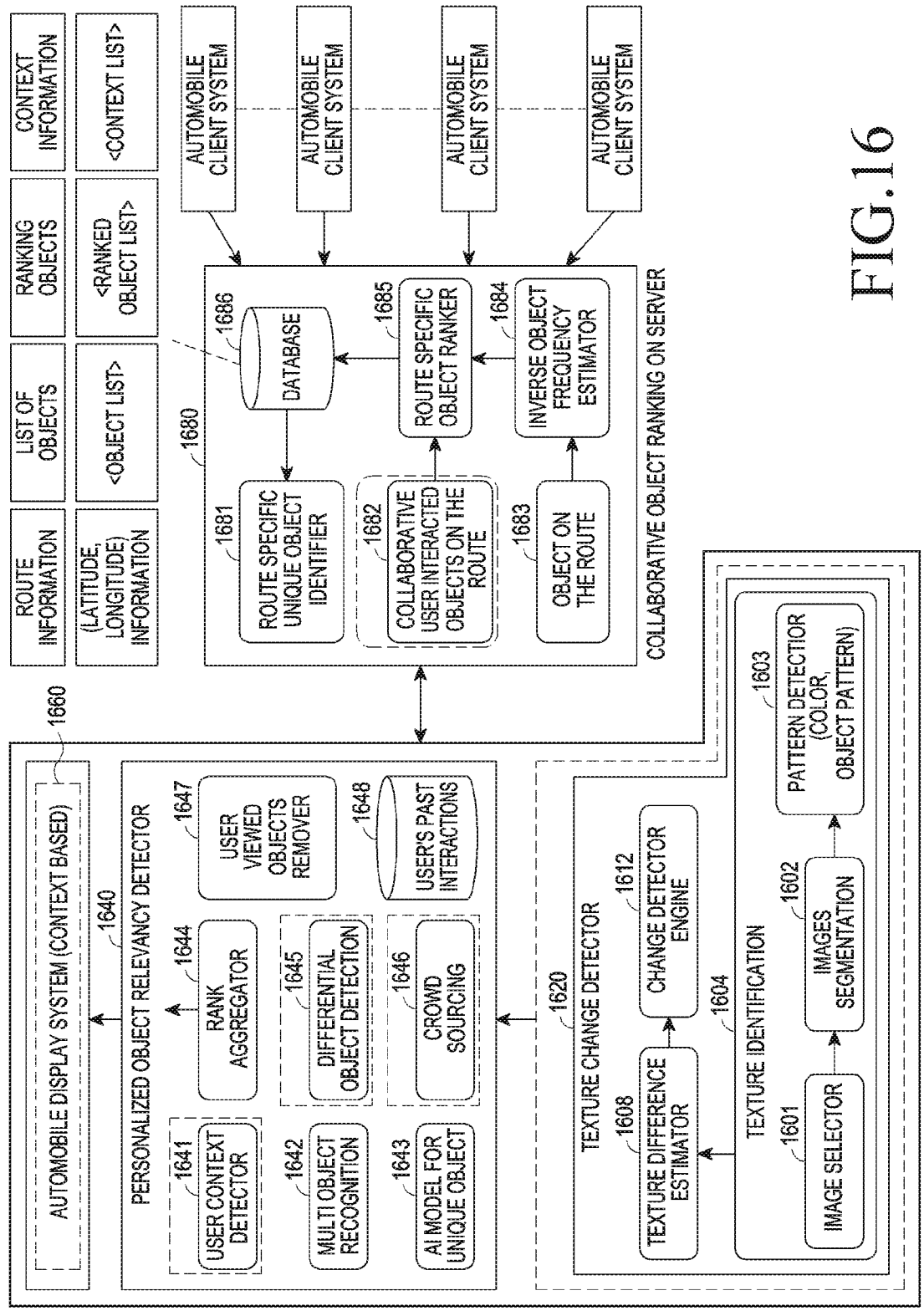
FIG. 16 illustrates a system diagram of a passed view recommendation module according to an embodiment.

FIG. 16 illustrates a system diagram of a passed view recommendation module according to an embodiment. The module includes a texture change detector 1620, a personalized object relevancy detector 1640, and an automobile display system 1660. The texture change detector further includes texture identification unit 1604, texture difference estimator 1608, and change detector engine 1612. The texture identification unit 1604 further includes an image selector 1601, image segmentation unit 1602, and pattern detector 1603. The personalized object relevancy detector 1640 includes user context detector 1641, multi-object recognition unit 1642, AI model 1643, rank aggregator 1644, differential object detection unit 1645, crowd sourcing 1646, user viewed object remover 1647, and a user's past interaction unit 1648. In addition, the system includes a server 1680.

The server 1680 includes a route specific unique object identifier unit 1681, a collaborative user interacted objects on the route unit 1682, objects on the route 1683, inverse object frequency estimator 1684, a route specific object ranker 1685, and a database 1686. The passed view recommendation module is part of the main system and includes texture change detector 1620, differential object detection unit 1645, crowd sourcing 1646, user context detector 1641 and a display system 1660.

The route texture analysis is to identify key objects. For example, advertisement boards and traffic signs have a specific color and text or symbols, such as moving objects. In order to determine differential objects based on importance, the system considers frequency of occurrence in the past, past travelled history, and abnormal size, color & shape based on typical objects understanding and newly launched cars, for example. Some traffic boards may be repeated, but some traffic boards are unique, face recognition of person for identification, famous monuments, and rarely seen animals may also be considered. This module enables the user to quickly select the desired object.

The system includes user interaction modules for user interactions with the glass window to be captured on various vehicles and transmitted to a remote server for processing. The user interaction may be from a current user who interacts with the glass window or a user who has previously interacted with the glass window during the drive, and now is collected and stored at the server. Based on the collected and processed information, trend data is prepared and presented to the user. The user interface provides captured sight information dynamically based on the predetermined objects and user's context. The display of the sight information includes at least one of the image or video display and video starting time. The user interface also provides future view sight information on the route to the user, where the future view sight information is retrieved using Internet media content.

Past user interactions with a smart window can be captured on various vehicles and collected on a server, and trend data is prepared based on the differential objects which are further refined and ranked based on importance. There may be various routes which have been followed by the vehicle in the past. For each route, the server makes an entry based on the latitude and longitude of the vehicle to define a route ID (for example, route ID 1, route ID 2, route ID 3 . . . ). In each route passed by the vehicle, there are various objects which are being captured, such as object O1, object O2, and object O3. In route ID 1 there are various objects which were selected or interacted by the one or of user U1, user U2, user U3, etc, during the drive path of route ID 1, i.e. Object O1: U1; Object O2: U3. Based on the collected information, each object is mapped with user's preferences to form an object-user matrix, as shown below in Table 3.

For example, object O2 is mapped to User U1 and User U2 and object O3 is mapped to User U2 and User Un. Using the above information, the system can determine and rank or score the object based on the number of users who have shown interest. In light of the matrix, a trend is prepared or formed based on which object has been of more interest and also interacted with by the user. For example, Object O1 is of less interest on route ID 1, whereas object O2 is of more interest. Tables 2 and 3 appear as follows:

TABLE 2

Crowd Sourced (Collaborative) Information

| Route ID [Latitude, longitude] | List of Objects in the <Object List> | Objects interacted by user <Object: User> |
|---|---|---|
| Route_ID_1 | <O1, O2, O3, . . . > | <O1: U1, O2: U3, . . . > |
| Route_ID_2 | <O5, O2, O4, . . . > | <O2: U4, O4: Un, . . . > |
| Route_ID_3 | <O2, O3, O4, . . . > | <O2: U1, . . . > |
| . . . | . . . | . . . |
| Route_ID_N | <O1, O8, O9, . . . > | <O1: U3> |

TABLE 3

User Matrix

| Object ID | U1 | U2 | . . . | Un | | Object ID | Collaborative Interest Frequency (f) |
|---|---|---|---|---|---|---|---|
| O1 | 1 | 0 | . . . | 0 | | O1 | f 1 |
| O2 | 1 | 1 | . . . | 0 | = | O2 | f2 |

TABLE 3-continued

User Matrix

| Object ID | U1 | U2 | ... | Un | | Object ID | Collaborative Interest Frequency (f) |
|---|---|---|---|---|---|---|---|
| O3 | 0 | 1 | ... | 1 | | O3 | f3 |
| ... | ... | ... | ... | ... | | ... | ... |
| Om | 0 | 0 | ... | 1 | | Om | fm |

When a user is travelling in route ID 1, the passed view information is prompted to the user of the objects which have high frequency. When the passed view requests interaction at the same location, this is likely to result in interest in the same object. In terms of travel context, the speed and turns will be similar for interest in the same object. The time of travel can also result in interest in the same subject (i.e. day time type-1 object, night time type-2 object on the same route). Use of the above will facilitate the user to reach the desired object quickly, as many users tend to enjoy the same objects on the same routes.

The system also provides user context based key object prediction for side window display before the user input is received. In this aspect, the differential objects can be further refined based on importance, such as by user profile, user's past viewing & interaction history, user's driving reason/context, person of interest, new objects on a route from earlier travel, first time travel, earlier display of the same object, user decreasing speed of the automobile, and conversation during travelling. From this information, the system improves user experience, and helps the user to reach to the desired object quickly.

The system provides a dynamic user interface for navigation. Based on the above factors and on a confidence factor on the differential objects which are determined by AI, a user interface window is chosen to display an image or video display, and video starting time, and the system improves user experience and enables the user to reach to the desired object quickly.

Figure 17:
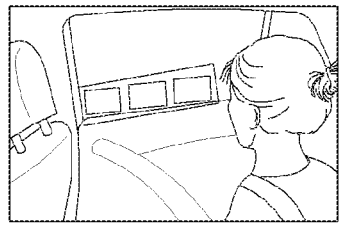
FIG. 17 illustrates an example view of a dynamic navigation area which is based on the context and confidence factor on the differential objects determined by AI according to an embodiment.
Figure 17:
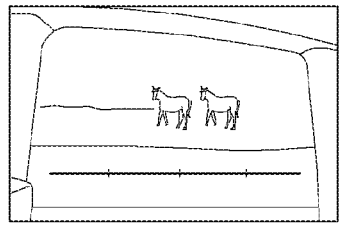
Figure 17:
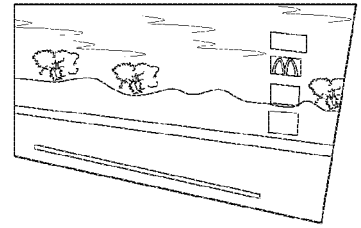
Figure 17:
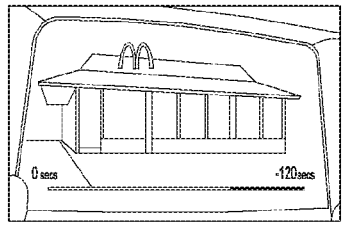
Figure 17:
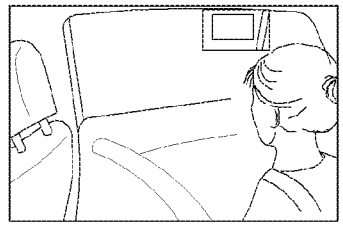
Figure 17:
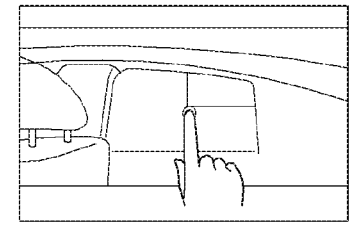

Referring to FIG. 17 in an example of a dynamic navigation area based on the context and confidence factor on the differential objects determined by AI, FIG. 17.1 illustrates a navigation area as tiles based on the differential objects determined by AI. FIG. 17.2 illustrates seek bar navigation which provides the video starting time and a period of time intervals thereof. The user can jump to any of the clips using the seek bar. FIG. 17.3 which illustrates a symbol of various objects, such as a KFC restaurant, McDonald's restaurant, a gas station, or a repair shop. The user can directly click or select any of the symbols to retrieve the information about the same. FIG. 17.4, illustrates different colors of the seek bar, in which the seek bar provides information to the user about the current position (0+60 sec), and the start (−120 sec) and end (0 sec) of the passed view requested information video. FIG. 17.5 illustrates the current view and passed view mode in PIP. FIG. 17.6, illustrates a hidden navigation area which is based on the user gesture. As shown, the display includes current view and passed view selection by adjusting shapes of areas for displaying the current view and the passed view as dragging a curtain.

Figure 18:
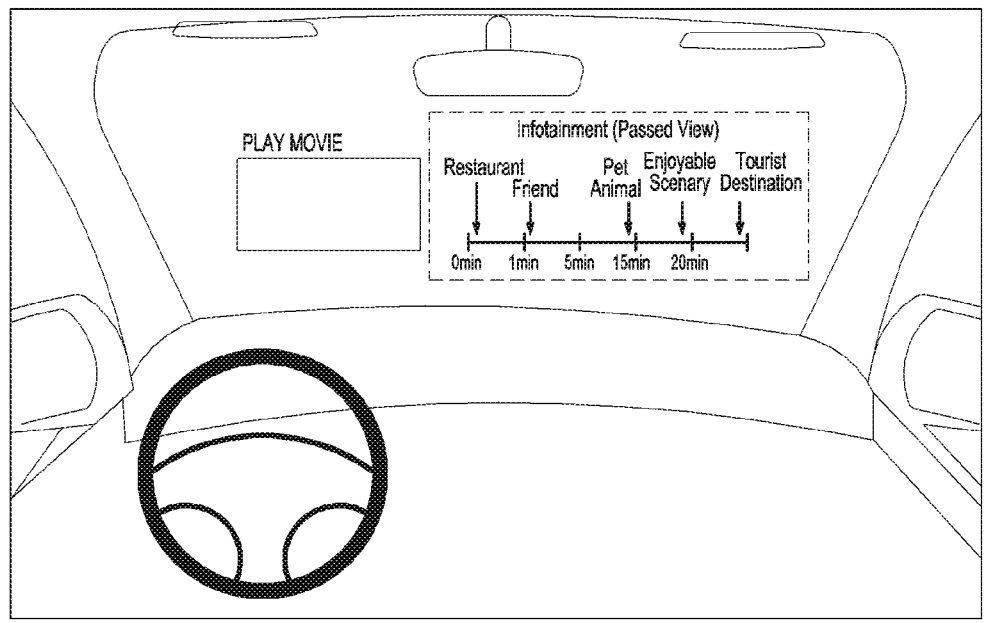
FIG. 18 illustrates a vehicle glass display showing the passed view to the user according to an embodiment.

FIG. 18 illustrates an example embodiment of a vehicle glass display showing the passed view to the user. During the drive, the user may be watching a movie on the display, and passed view information is also prompted or shown to the user. The passed view information may include one or more labels including but not limited to a restaurant, a friend, a pet animal, enjoyable scenery, or a tourist destination. This information is shown on the display with the time interval which has been passed on the drive with respect to current location of the vehicle.

Figure 19:
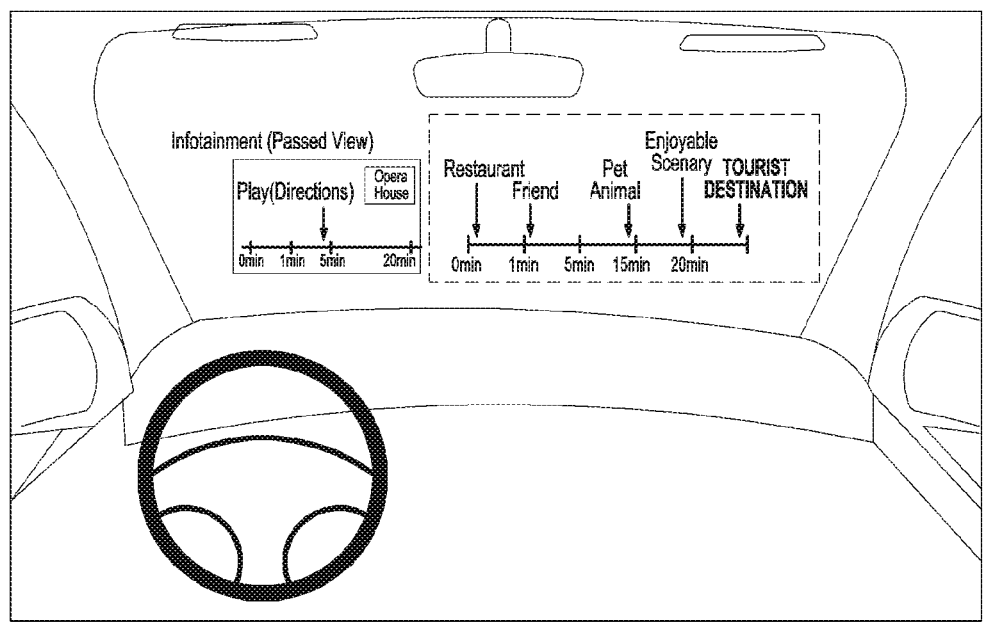
FIG. 19-23 illustrates various examples where a user interacts with the display (passed view information) according to embodiments.
Figure 20:
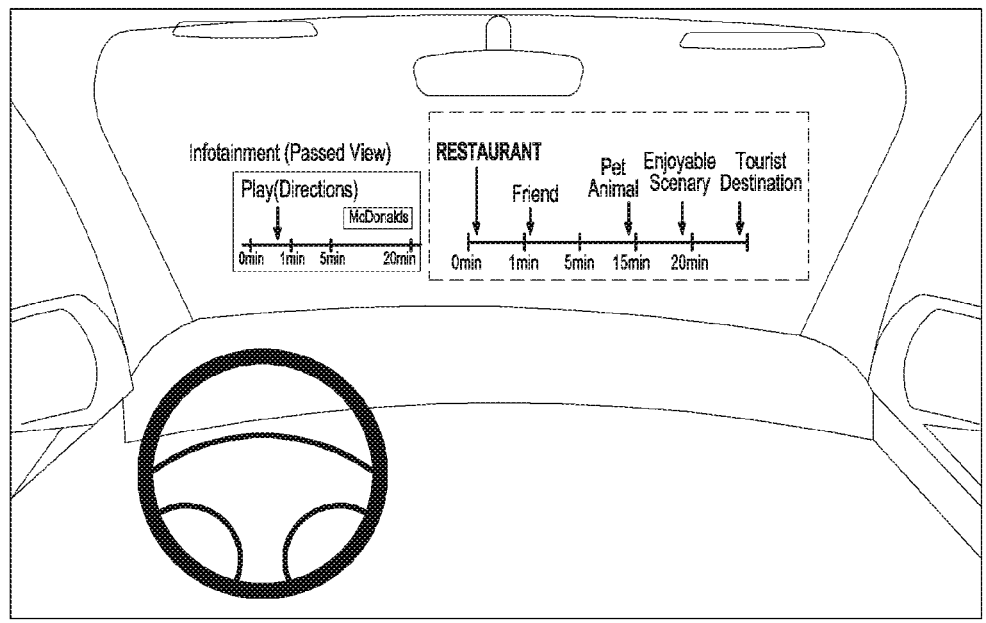

FIG. 19 illustrates when the user interacts with the display to select or to know about a tourist destination, prompted by the display, which has been passed during the drive. The user may want to know more details on the tourist destination or the destination which he/she has not properly seen during the drive. Upon selecting the tourist destination label, the display provides all the details about the destination which includes at least history, importance of the destination, and more detailed views of the destination, for example. Similarly, by selecting the restaurant label, the display provides more details of the restaurant which has been passed by during the drive as shown in FIG. 20.

Figure 21:
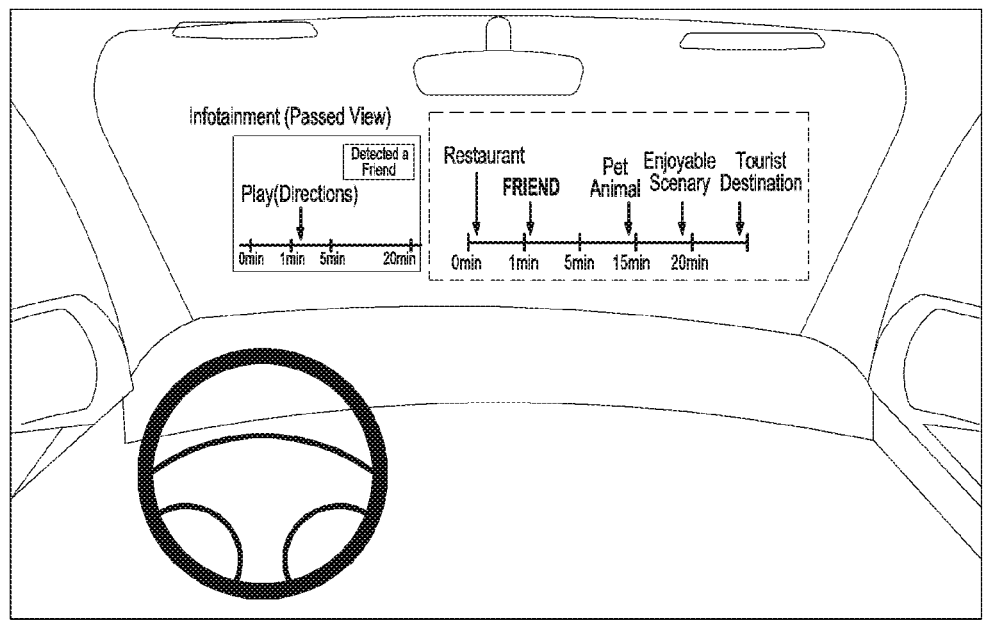
Figure 22:
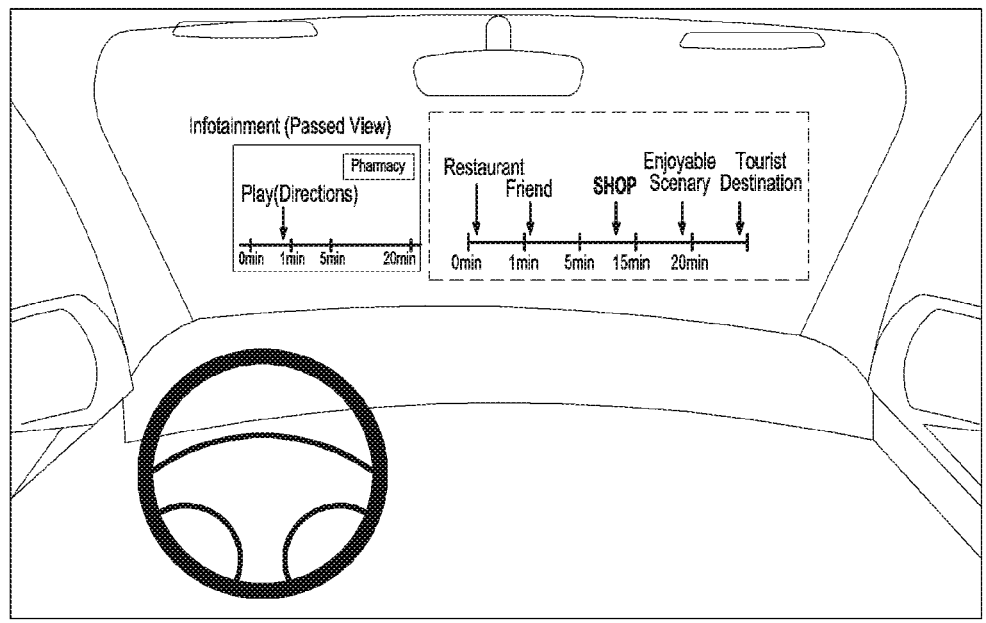

As shown in FIG. 21, by selecting the friend label, the user is able to retrieve the exact picture and the location of the person from the display. By interacting with the screen, user is able to see more in details about the picture of his/her friend. Referring to FIG. 22, which illustrates the shop (i.e. pharmacy) which has been captured by the system during the drive, the user is able to retrieve more information about the pharmacy, such as the name of the pharmacy and contact details of the pharmacy.

Figure 23:
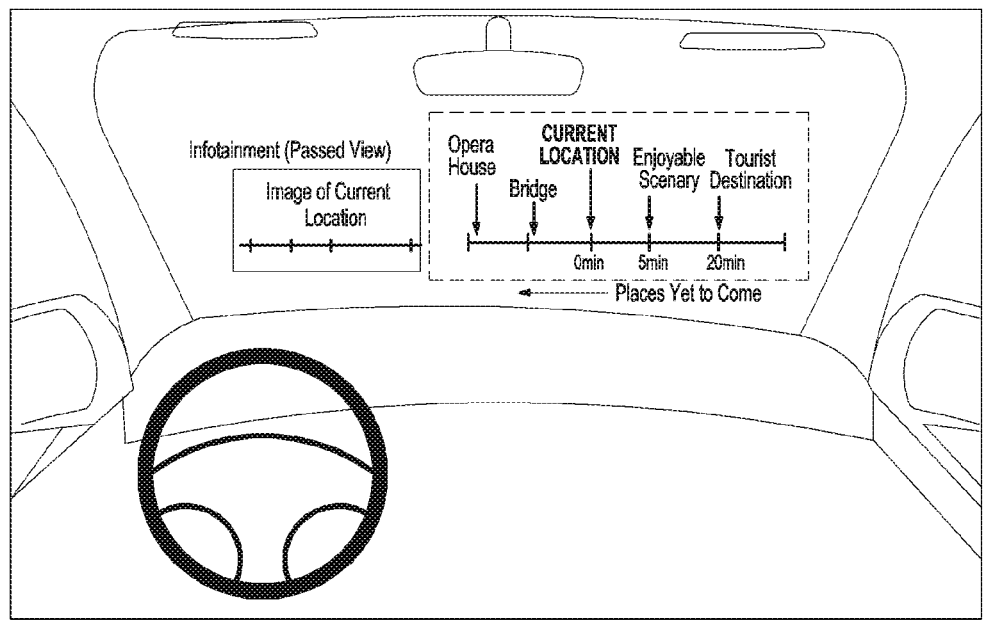

Referring to FIG. 23, which shows the display of the current location of the vehicle, apart from the current location, the display is able to provide both the passed view information and the information of the places which are yet to be reached on the route of the vehicle. The future places information may be retrieved from the server which was stored. The information stored at the server may be general information available on the route using maps, or it may include information browsed by other users actively during the drive. By selecting any of these options, the user is able to retrieve and view all the information of the route.

Figure 24:
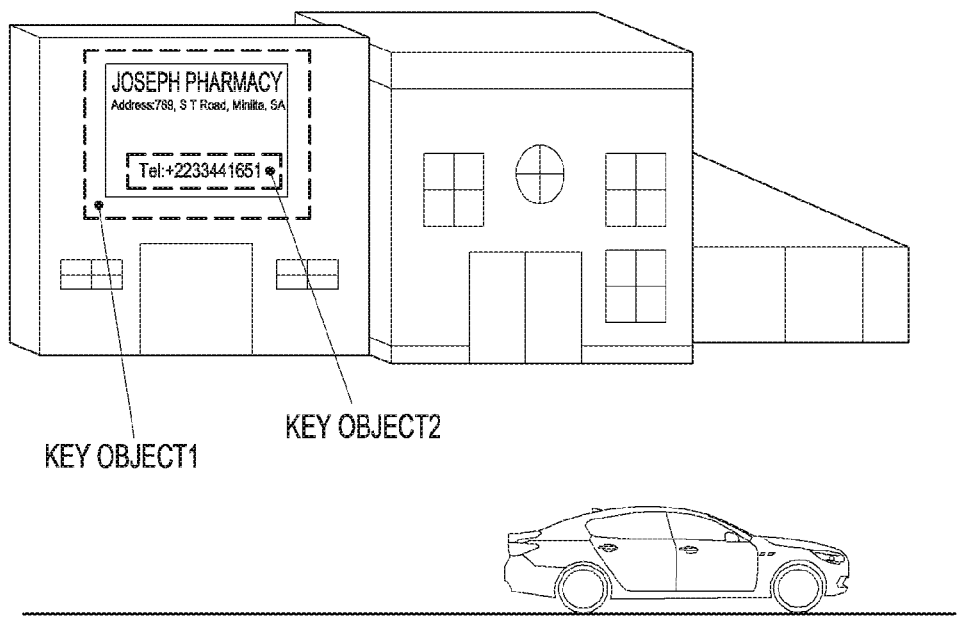
FIG. 24 illustrates an example scenario of picking of the key objects by AI engine according to an embodiment.

Referring to FIG. 24, the user saw a pharmacy while travelling but could not properly view the phone numbers of the store. The user makes a touch gesture on the side window. Prior to that, the AI engine has already picked as the pharmacy as a key object (along with other key objects) and based on user request context (time/distance after passing the object, past interaction etc.), directly provides the (e.g. red color marked) "phone number" content to user. The user can click and save this information on his/her mobile device as well by interacting on the side window. Key objects are ranked based on importance, even if the first object shown wasn't the one the user was looking for, and the user can navigate to the remainder of the key objects.

Figure 25:
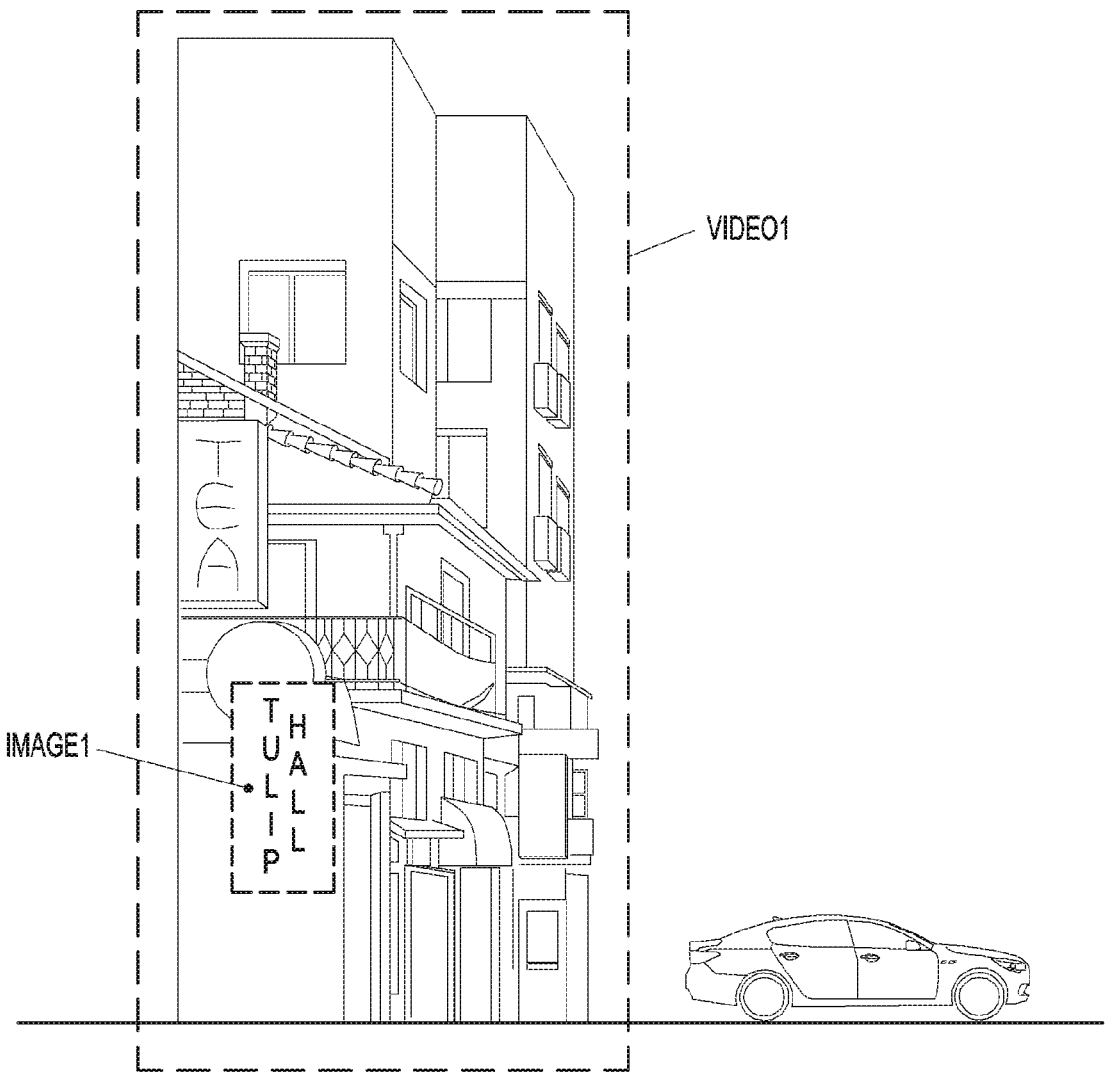
FIG. 25 illustrates an example scenario of retrieving pass view information from one or more sources via a server according to an embodiment.

Referring to FIG. 25, a user saw a building during the drive, and admired the building architecture. The user makes a gesture and a unique building design pre-identified as unique is shown to the user as a video overview. While on a drive, the user could not read the full name of the hall. The user gives input on the side window. Even if it was not visible, the earlier image recorded by another car can be used to provide a clearer image, with the assistance of the server.

Figure 26:
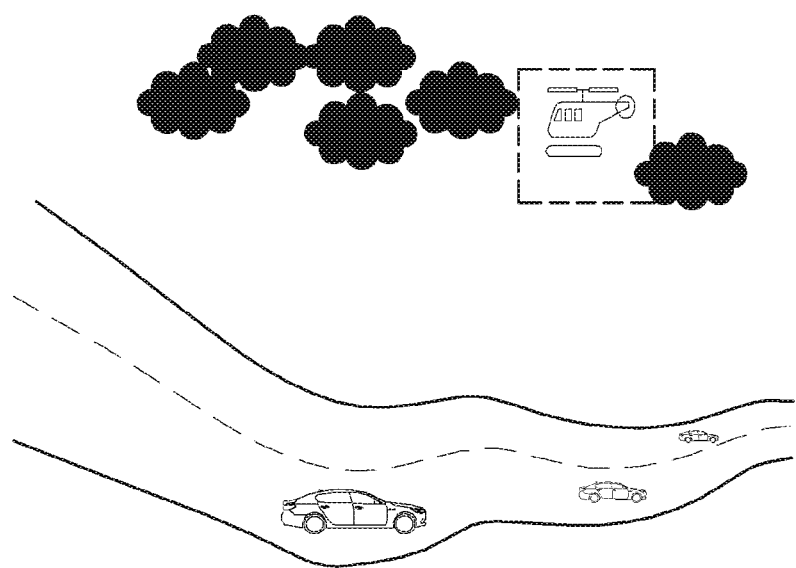
FIG. 26 illustrates an example where specific objects are of high importance according to an embodiment.

Referring to FIG. 26, moving objects such as a helicopter are given high importance, as they attract the user's attention. Even if it has disappeared, the user can return and see in more details while travelling.

As is apparent from the foregoing description, the driving experience of the passengers in the vehicles may be improved, by enabling viewing of passed by images.

The effects according to the disclosure are not limited to the above-described matters, and other various effects may be included in the specification.

In the foregoing, various features are grouped together in a single embodiment for the purpose of streamlining the disclosure.

While the present disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method of displaying content on a glass window of a vehicle, the method comprising:
   capturing sight information of surrounding scenery of the vehicle during a first time period, by using at least one first image capturing device which is installed on an exterior of the vehicle;
   identifying a request for displaying content related to the sight information from a user during a second time period after the first time period, using at least one second image capturing device which is installed in an interior of the vehicle; and
   displaying the content related to the sight information on a first part of the glass window of the vehicle based on the request, while displaying a current view on a second part of the glass window,
   wherein the displayed content is calibrated based on a first distance between the glass window and the at least one first image capturing device, and a second distance between the glass window and the at least one second image capturing device.

2. The method of claim 1, further comprising capturing coordinates of eyes or a head of the user to emulate rendering of the content to display on the glass window, by using the at least one second image capturing device.

3. The method of claim 1,
   wherein the content related to the sight information is displayed in a user interface on the glass window of the vehicle, and
   wherein the user interface comprises a display area for displaying the content related to the sight information and a navigation area for displaying a passed time related to the displayed content.

4. The method of claim 3,
   wherein receiving the request comprises receiving information about the passed time from the user, and
   wherein the displayed content corresponds to the passed time.

5. The method of claim 1, further comprising displaying a plurality of passed views on the glass window,
   wherein receiving the request comprises receiving selection of at least one passed view among the plurality of passed views, and
   wherein the displayed content corresponds to the selection of the at least one passed view.

6. The method of claim 1, further comprising:
   transmitting the captured sight information to a server to identify objects included in the captured sight information; and
   receiving the processed data in relation to the objects from the server.

7. The method of claim 1,
   wherein the content related to the sight information is displayed in a semi-transparent interface on the glass window of the vehicle, and
   wherein the semi-transparent interface comprises a transparent area and the display area for displaying the content.

8. The method of claim 1,
   wherein the displayed content corresponds to a transparent view of the glass window during the first time period.

9. The method of claim 1,
   wherein the displayed content is calibrated further based on at least one of a size of the glass window, a shape of the glass window, and the sight information.

10. A device for displaying content on a glass window of a vehicle, the device comprising:
    a memory; and
    a processor connected with the memory and configured to:
    capture sight information of surrounding scenery of the vehicle during a first time period, by using at least one first image capturing device which is installed on an exterior of the vehicle;
    identify a request for displaying content related to the sight information from a user during a second time period after the first time period, using at least one second image capturing device which is installed in an interior of the vehicle; and
    display the content related to the sight information on a first part of the glass window of the vehicle based on the request, while displaying a current view on a second part of the glass window,
    wherein the displayed content is calibrated based on a first distance between the glass window and the at least one first image capturing device, and a second distance between the glass window and the at least one second image capturing device.

11. The device of claim 10,
    wherein the processor is further configured to capture coordinates of eyes or a head of the user to emulate rendering of the content to display on the glass window, by using the at least one second image capturing device.

12. The device of claim 10,
    wherein the content related to the sight information is displayed in a semi-transparent interface on the glass window, and
    wherein the user interface comprises a display area for displaying the content related to the sight information and a navigation area for displaying a passed time related to the displayed content.

13. The device of claim 12,
    wherein the request comprises information about the passed time, and the displayed content corresponds to the passed time.

14. The device of claim 10,
    wherein the processor is further configured to display a plurality of passed views on the glass window,
    wherein the request comprises selection of at least one passed view among the plurality of passed views, and
    wherein the displayed content corresponds to the selection of the at least one passed view.

15. The device of claim 10, wherein the processor is further configured to:
    transmit the captured sight information to a server to identify objects included in the captured sight information; and
    receive the processed data in relation to the objects from the server.

16. The device of claim 10,
    wherein the content related to the sight information is displayed in a semi-transparent interface on the glass window, and wherein the semi-transparent interface comprises a transparent area and the display area for displaying the content.

17. The device of claim 10,
wherein the displayed content corresponds to a transparent view of the glass window during the first time period.

18. The device of claim 10,
wherein the displayed content is calibrated based on at least one of a size of the glass window, a shape of the glass window, and the sight information.

* * * * *